(12) United States Patent
Yoshimura

(10) Patent No.: US 7,723,868 B2
(45) Date of Patent: May 25, 2010

(54) OPERATING SWITCH WIRING DEVICE AND HANDLE MEMBER THEREFOR

(75) Inventor: Yuichi Yoshimura, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 883 days.

(21) Appl. No.: 11/408,918

(22) Filed: Apr. 24, 2006

(65) Prior Publication Data

US 2006/0238030 A1 Oct. 26, 2006

(30) Foreign Application Priority Data

Apr. 25, 2005 (JP) .............................. 2005-127186

(51) Int. Cl.
*H01H 47/00* (2006.01)
*H01H 19/10* (2006.01)
*H01H 3/12* (2006.01)
*H01H 9/02* (2006.01)
*H02B 1/26* (2006.01)

(52) U.S. Cl. ......................... 307/115; 307/40; 307/119; 307/120; 307/139; 361/622; 361/631; 361/632; 361/641; 361/643

(58) Field of Classification Search ................... 307/40, 307/115, 119, 120, 139; 361/171, 172, 191, 361/622, 626, 631, 632, 641, 643
See application file for complete search history.

(56) References Cited

U.S. PATENT DOCUMENTS

| | | | | |
|---|---|---|---|---|
| 3,906,295 | A | * | 9/1975 | Tessmer ...................... 361/643 |
| 5,453,738 | A | * | 9/1995 | Zirkl et al. ............. 340/825.52 |
| 6,459,938 | B1 | * | 10/2002 | Ito et al. ........................ 700/9 |
| 2006/0022791 | A1 | | 2/2006 | Yoshimura |

FOREIGN PATENT DOCUMENTS

JP  3-94597  4/1991
JP  8251675  9/1996

* cited by examiner

*Primary Examiner*—Jared J Fureman
*Assistant Examiner*—Hal I Kaplan
(74) *Attorney, Agent, or Firm*—Greenblum & Bernstein P.L.C.

(57) ABSTRACT

An operating switch wiring device capable of easily setting a load which is a group control object, without using a dedicated setter, and a handle member used therefore. The operating switch wiring device used for a remote supervisory control system includes a plurality of individual switches which are individually assigned with addresses corresponding to addresses of relays and individually turn on/off the relays, a group switch which groups one or plural of the individual switches into a group and collectively turns on/off the relays corresponding to the individual switches in the group, and group setting switches which are provided in correspondence with the individual switches and set whether each of the individual switches are registered in the group.

7 Claims, 15 Drawing Sheets

OPERATING SWITCH WIRING DEVICE AND HANDLE MEMBER THEREFOR

BACKGROUND OF THE INVENTION

1. Field of the Invention

The present invention relates to an operating switch wiring device used for a remote supervisory control system for performing remote supervisory control of a load such as a lighting apparatus and a handle member therefor.

2. Description of the Related Art

Conventionally, a remote supervisory control system having a configuration shown in FIG. 14(a) is known (For example, see Japanese Patent Laid-open No. H03-94597). In this remote supervisory control system, a relay-equipped parent device (hereinafter, referred to as control parent device) 101, a plurality of relay-equipped child devices (hereinafter, referred to as control child device) 102 and 102, a plurality of operating switch wiring devices 103 to 105, and an address setting terminal 106 are connected (multi-drop connected) to a two-wire signal line Ls.

This system includes two devices (control parent device 101 and control child device 102) as a remote control wiring device which controls a relay for turning on/off power applied to load. The control parent device 101 includes eight relays and each control child device 102 includes four relay circuits. Meanwhile, the operating switch wiring device 103 includes a plurality of operating buttons 103a of pattern switches for collectively controlling a number of loads in a prescribed control state, and monitors operating states of the pattern switches. In addition, the operating switch wiring device 104 includes an operating button 104a of a group switch for collectively controlling the number of loads in same control state, and monitors operating states of the group switch. Furthermore, the operating switch wiring device 105 includes a plurality of operating buttons 105a of individual switches for individually turning on/off the loads, and monitors operating states of the plurality of individual switches.

The relays included in the control parent device 101 and the control child device 102 and the switches included in the operating switch wiring devices 103 to 105 are set with respective individual addresses. The control parent device 101 individually recognizes the switches of the operating switch wiring devices 103 to 105 and the relays of the control parent device 101 and the control child device 102 using their addresses.

Since the control parent device 101 has a function of a transmission control device, the control parent device 101 transmits a transmission signal Vs having a format shown in FIG. 14(b) to the signal line Ls. In other words, the transmission signal Vs is a bipolar (±24 V) time division multiplex signal including a start pulse signal ST representing transmission start of a signal, mode data MD representing a mode of the transmission signal Vs, address data AD for individually calling for each of the control child devices 102 or the operating switch wiring devices 103 to 105, control data CD for controlling a load or a relay, and checksum data CS for detecting an transmission error, and a signal carrying period WT which is a time slot for receiving a carrying signal (monitoring data) from the control child device 102 or the operating switch wiring devices 103 to 105, and data is transmitted as data by pulse width modulation (FIG. 14(c)). When address data AD transmitted by the transmission signal Vs received through the signal line Ls is identical to an address which is previously set, the control child device 102 and the operating switch wiring devices 103 to 105 receives the control data CD from the transmission signal Vs and carries the monitoring data as a current mode signal (signal transmitted by short-circuiting the signal line Ls through an adequately low impedance) in the signal carrying period WT of the transmission signal Vs.

When data is transmitted from the control parent device 101 to a desired the control child device 102 or operating switch wiring devices 103 to 105, the transmission signal Vs including the mode data MD as a control mode and an address assigned to the relay included in the control child device 102 or the switch included in the operating switch wiring devices 103 to 105 as the address data AD is transmitted. When the transmission signal Vs is transmitted to the signal line Ls, the control child device 102 or operating switch wiring devices 103 to 105 having an address identical to the address data AD receives the control data CD and carries monitoring data in the signal carrying period WT. The control parent device 101 confirms whether the control data CD is transmitted to the desired one of the control child device 102 and operating switch wiring devices 103 to 105 by a relationship between the transmitted control data CD and the monitoring data received in the signal carrying period WT. The control child device 102 controls the relay having corresponding address according to the received control data CD. In addition, the operating switch wiring devices 103 to 105 output the monitoring signal for confirming display of the relay according to the received control data CD.

In addition, the control parent device 101 usually transmits the transmission signal Vs including the mode data MD as a dummy mode at a regular interval (full-time polling), and, when the operating switch wiring devices 103 to 105 are desired to transmit any information to the control parent device 101, generates an interrupt signal Vi shown in FIG. 14(d) in synchronization with the start pulse signal ST of the transmission signal Vs of the dummy mode. At this time, the operating switch wiring devices 103 to 105 are prepared for transmitting/receiving later information to/from the control parent device 101. When the control parent device 101 receives the interrupt signal Vi, the control parent device 101 transmits the transmission signal including the mode data MD as an interrupt polling mode while sequentially increasing upper half bits of the address data AD. The operating switch wiring devices 103 to 105, which generate the interrupt signal, carry lower half bits of the address to the control parent device 101 in the signal carrying period WT, when the upper half bits of the address data AD of the transmission signal of the interrupt polling mode is identical to upper half bits of the address of the switch included in the operating switch wiring devices 103 to 105.

When the control parent device 101 acquires the address of the operating switch wiring devices 103 to 105 which generate the interrupt signal (that is, address of the operated switch), the transmission signal having the address data AD obtained using the mode data MD as the monitoring mode is transmitted to the signal line Ls. The operating switch wiring devices 103 to 105 carry the information to be transmitted in the signal carrying period WT with respect to the transmission signal. Finally, the control parent device 101 transmits a signal indicating interrupt reset to the operating switch wiring devices 103 to 105 which generate the interrupt signal and releases the interrupt plug of the operating switch wiring devices 103 to 105. In this way, the transmission of the information from the operating switch wiring devices 103 to 105 to the control parent device 101 is completed by transmitting the signals (dummy mode, interrupt polling mode, monitoring mode, and interrupt reset) from the control parent device 101 to the operating switch wiring devices 103 to 105 four times. In addition, the control parent device 101 has only to transmit the transmission signal using the mode data MD as the monitoring data in order to monitor the operating state of a desired control child device 102.

The above-described operation is summarized as follows: First, when input data is generated by operation of any one the operating buttons 103a to 105a of the switches, the monitoring data corresponding to the input data from the operating switch wiring devices 103 to 105 is carried to the control parent device 101. When the address of the operated switch corresponds to the address of the its own relay, the control parent device 101 controls the relay, and, when the address of the operated switch corresponds to the address of the relay included in a control child device 102, transmits the control data DC to the control child device 102 to control the relay by being corresponded the control child device 102. In addition, the control parent device 101 manages the correspondence relation of the address between the relay and the pattern switch or the group switch such that the plurality of relays can be collectively controlled by operation of any one of the switches.

The operating switch wiring device 105 is a terminal for monitoring the operating states of the plurality of individual switches. The configuration of the operating switch wiring device 105 will be described with reference to FIGS. 13(a) to 13(c).

The operating switch wiring device 105 includes a device body 110 implanted in a building wall surface. Eight flexible parts 112 are provided at a right side of a front surface of the device body 110 in a vertical direction in parallel and a display lamp 113 for indicating an operating state of a load, such as a light emitting diode (LED), is provided at the left side of each of the flexible parts 112. Each of the flexible parts 112 is divided by a slit formed over its circumference except one end so that the one end is cantilever-supported by the device body 110, and has a cylindrical press button 112a integrally formed at the other end of thereof. In the device body 110, individual switches (not shown) which consist of tact stitches are received to face the flexible parts 112, respectively. By pressing the press button 112a to bend the flexible part 112 inward, the individual switch can be pressed at the rear side of the flexible part 112. In addition, an address setting switch which consists of a rotary switch is received in the device body 110 and a rotation handle 114 of the address setting switch is exposed at a center portion of a front surface of the device body 110. The addresses of eight individual switches are set to any one of 1 to 8, 9 to 16, 17 to 24, 25 to 32, 33 to 40, and 41 to 48 according to the rotation position of the rotation handle 114. For example, when the address is set to 9 to 16 using the rotation handle 114, the addresses of the eight individual switches are set to 9, 10, 11, . . . , and 16 in that order from the top.

Furthermore, a face cover 111 is attached to the front surface of the device body 110. The face cover 111 has a cover main body 116 in the shape of a rectangular plate having a size substantially equal to that of the front surface of the device body 110, and is attached to the front surface of device body 110 by engaging elastic engagement claws protruding from the left and right sides of the rear surface of the cover main body 116 with engagement holes formed at the left and right sides of the front surface of the device body 110. Perforated holes (not shown) though which the press buttons 112a and the display lamps 113 passes are formed on the cover main body 116 at portions facing the press buttons 112a and the display lamps 113 provided on the front surface of the device body 110, and a front identification plate 117 made of flexible resin is attached to the front surface of the cover main body 116. The front identification plate 117 is called a membrane sheet. Operating buttons 105a protruding forward are formed on the front identification plate 117 at a portion facing the press buttons 112a. In addition, on the front identification plate 117, light transmitting parts 119 and 120 are formed at portions facing the display lamps 113 and a name card 118 attached to the rear surface of the cover main body 116. The light of the display lamps 113 and the character of the name card 118 are externally visible with eye though the light transmitting portions.

[Patent Document 1] Japanese Patent Laid-open No. H03-94597

In the above-described remote supervisory control system, the operating switch wiring device 105 which monitors the operation of the individual switches for individually operating a load and the operating switch wiring devices 103 and 104 which monitor the operation of the group switch or the pattern switch are provided. To set the addresses of the individual switches or the addresses of the loads which are collectively controlled by the group control or the pattern control, the dedicated address setting terminal 106 needs to be prepared and thus a cost of the system increases. In addition, when the group control or the pattern control is set using the address setting terminal 106, a group number or a pattern number (address of the group switch or the pattern switch) must be set in correspondence with the address of the load which is a group control object or a pattern control object. Accordingly, only a worker having special knowledge can perform a setting operation and it takes much time to set the group number or the pattern number. In addition, during setting the address, the overall system is in an address setting state and thus general load control cannot be performed.

SUMMARY OF THE INVENTION

The present invention is contrived to solve the above-mentioned problems and it is an object of the present invention to provide an operating switch wiring device capable of easily setting a load which is a group control object, without using a dedicated setter, and a handle member used therefor.

To achieve the object above, the first aspect of the present invention is characterized in that an operating switch wiring device used for a remote supervisory control system, in which the operating switch wiring device for monitoring switch operations of operating switches assigned with individual addresses and a remote control wiring device for controlling opening/closing of relays assigned with the individual addresses are connected to a signal line, the operating switch wiring device outputs a transmission signal including address information and operation information according to the operations of the operating switches to the signal line, and the remote control wiring device turns on/off a relay corresponding to the address information when the address information included in the transmission signal received through the signal line is identical to the address of the corresponding relay, wherein the operating switches include a plurality of individual switches which are assigned with addresses corresponding to the addresses of the relays and individually turn on/off the corresponding relays and a group switch which groups one individual switch or plural individual switches into a group and collectively turns on/off the relays corresponding to the individual switches in the group, and a group setting means for setting whether the respective individual switches are registered in the group.

According to the present invention, it is possible to individually turn on/off the corresponding relays using the plurality of individual switches included in the operating switch wiring device, further, it is possible to collectively turn on/off the relays registered in the group using the group switch, and it can be set whether the individual switches are registered in the group using the group setting means included in the operating switch wiring device. Accordingly, since the group can be set by the operating switch wiring device although a dedicated setter for setting the group is not used, the group can be easily set. In addition, since the remoter supervisory control system performs a general control operation during setting, the load can be always controlled.

The second aspect of the present invention is characterized in that the invention according the first aspect, in which press portions of the plurality individual switches and a press portion of the group switch may be disposed on the front surface of a device body provided on a construction surface, includes; an operating handle which is rotatably attached on the device body and has a window hole for exposing the press portions at portions facing the press portions of the individual switches and a press protrusion for pressing the press portion of the group switch according to a rotation operation at a rear surface thereof; and a door which is rotatably attached on the front surface of the operating handle between a position for exposing the press portions of the individual switches and a position for covering the press portions of the individual switches, wherein the group setting means is disposed at the rear surface of the door.

According to the present invention, since the group setting means is disposed on the rear surface side of the door, a mounting space of the group setting means can be more sufficiently ensured and a larger group setting means can be used, compared with a case where the group setting means is disposed in addition to the individual switches and the press portion of the group switch on the front surface of the device body. Thus, operability is improved. In addition, since an empty space of the front surface of the device body is wide, the empty space can be used for displaying the use of the individual switches.

The third aspect of the present invention is characterized in that the invention according the first aspect, in which press portions of the individual switches is disposed on the front surface of a device body provided on a construction surface, includes; an operating handle which is rotatably attached on the device body and has a window hole for exposing the press portions at portions corresponding to the press portions of the individual switches; a door which is rotatably attached on the front surface of the operating handle between a position for exposing the press portions of the individual switches and a position for covering the press portions of the individual switches; and a plurality of press operators which can be movably provided at the rear surface of the door between a position in which the individual switches face the press portions of the individual switches to press the corresponding press portions according to the rotation of the operating handle and a position in which the individual switches are separated from the press portions, wherein the plurality of press operators configure the group setting means, and the plurality of individual switches serve function as the group switch.

According to the present invention, since the plurality of press operators which can be movably provided at the rear surface of the door between a position in which the individual switches face the press portions of the individual switches to press the press portions according to the rotation of the operating handle and a position in which the individual switches are separated from the press portions are included, the plurality of press operators configure the group setting means, the plurality of individual switches can double as the group switch. Therefore, it is possible to reduce the number of parts by removing the group switch and to device cost retrenchment. Also, since the group setting means is composed of mechanical operators, a switch or wiring is unnecessary and thus the cost thereof can be more reduced, compared with a case where the group setting means is composed of electrical switches. In addition, an unskilled worker can easily set the group. In addition, the remote supervisory control system can perform a general load control during setting.

The fourth aspect of the present invention is characterized in that a handle member used for an operating switch wiring device of a remote supervisory control system, in which the operating switch wiring device for monitoring switch operations of a plurality of operating switches assigned with individual addresses and a remote control wiring device for controlling opening/closing of relays assigned with the individual addresses are connected to a signal line, the operating switch wiring device outputs a transmission signal including address information and operation information according to the operations of the operating switches to the signal line, and the remote control wiring device turns on/off a relay corresponding to the address information when the address information included in the transmission signal received through the signal line is identical to the address of the relay, comprises a operating handle having attaching means for being rotatably attached on a front surface of a device body of the operating switch wiring device, wherein the operating handle including a group setting means for setting whether the individual switches included in the operating switch wiring device are registered in a group for collectively turning on/off relays corresponding to the individual switches and press operators for pressing the individual switches in the group according to the rotation of the operating handle by the group setting means are proved in the operating handle.

According to the present invention, when the operating handle is attached to the front surface of the device body of the operating switch wiring device using an attaching means, the press portions provided on the operating handle can collectively press the individual switches registered in the group according to the rotation of the operating handle. Accordingly, only attaching the handle member to the existing operating switch wiring device including the plurality of individual switches, it is possible to easily add the group control function. In addition, since it can be set whether the individual switches are registered in the group using the group setting means provided on the operating handle, a setter for performing a group is unnecessary. Thus, it is possible to easily set the group.

The fifth aspect of the present invention is characterized in that the invention according to the fourth aspect 4, in which the operating handle has a windows hole for exposing the press portions at portions facing the press portions of the individual switches disposed on the front surface of the device body, includes a door which is rotatably attached on the front surface of the operating handle between a position for exposing the press portions of the individual switches and a position for covering the press portions of the individual switches and press operators which are movably provided at the rear surface of the door between a position in which the individual switches face the press portions of the individual switches to press the press portions according to the rotation of the operating handle and a position in which the individual switches are separated from the press portions, wherein the press operators provided at the respective individual switches configure the group setting means.

According to the present invention, since the individual switches can be operated when the door attached to the front surface of the operating handle, it is possible to operate individually the individual switches. In addition, when the door is closed, the press operators which are moved to the position facing the press portions of the individual switches can press the press portions of the individual switches according to the rotation of the operating handle, it is possible to collectively operate the individual switches registered in the group. Furthermore, since the group setting means is composed of the mechanical press operators and it can be set whether the individual switches are registered in the group by changing the positions of the press operators, an unskilled worker can easily set the group. In addition, the remoter supervisory control system can perform a general load control during setting.

BRIEF DESCRIPTION OF THE DRAWINGS

The above and other features and advantages of the present invention will become more apparent by describing in detail exemplary embodiments thereof with reference to the attached drawings in which:

FIG. 2(a) shows a state of detaching a handle member and FIG. 2(b) is an enlarged view of a portion A;

FIG. 3(a) is a front view thereof and FIG. 3(b) is a front view thereof in a state of opening a door;

FIG. 4(a) is a side view thereof and FIG. 4(b) is a block diagram thereof;

FIG. 11(a) shows a state of detaching the handle member from an operating switch wiring device and FIG. 11(b) is a top view of the handle member;

FIG. 13(a) shows a state before installing of name cards and FIG. 13(b) is a state after that;

FIG. 15 shows an operating switch wiring device used in the remote supervisory control system, wherein FIG. 15(a) is a front view thereof, FIG. 15(b) is a front view thereof in a state of detaching a face cover, and FIG. 15(C) is a front view of the face cover.

DETAILED DESCRIPTION OF THE INVENTION

Hereinafter, exemplary embodiments of the present invention will be described with reference to the accompanying drawings.

First Embodiment

Figure 3:
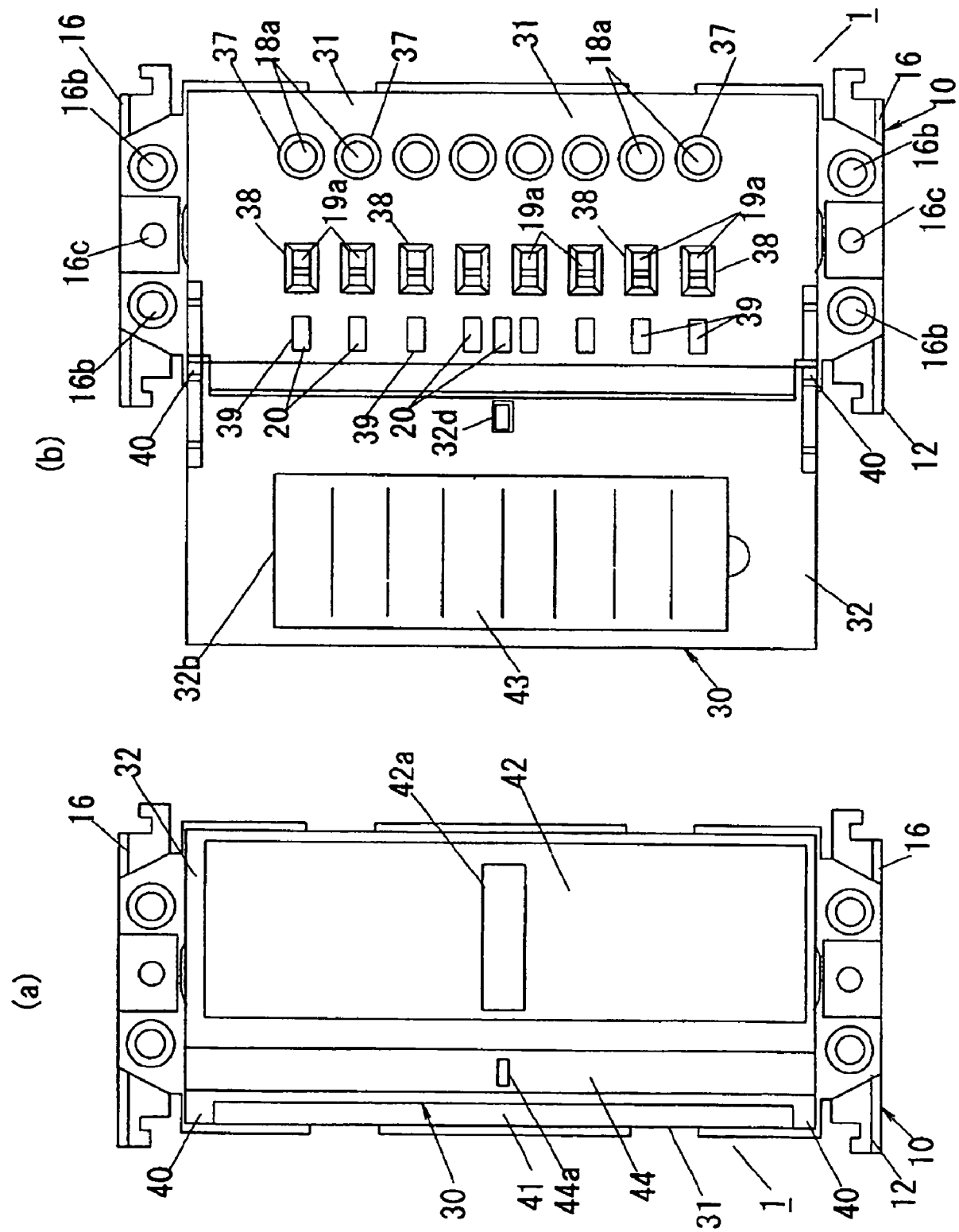
FIG. 3 shows the operating switch terminal according to the first embodiment of the present invention, where
Figure 4:
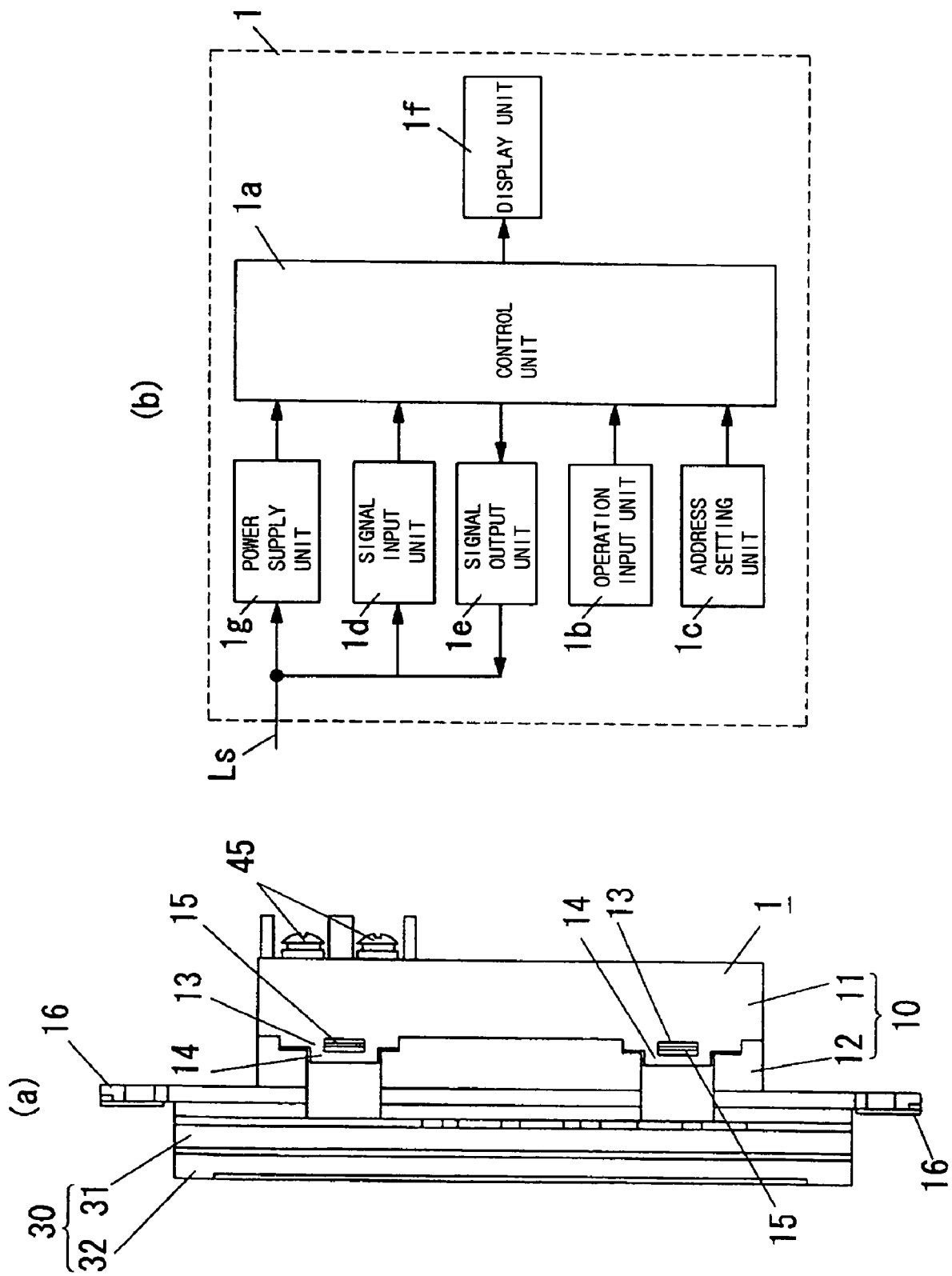
FIG. 4 shows the operating switch terminal according to the first embodiment of the present invention, where

An operating switch wiring device according to a first embodiment of the present invention will be described with reference to FIGS. 1 to 4. In addition, in the following description, unless otherwise noted, upper, lower, left, right sides are defined by directions of FIG. 3(a) and a front face of FIG. 3(a) is a front surface. Thus, a right end of FIG. 4(a) is a rear end.

The operating switch wiring device is used in the remote supervisory control system described in Description of the Related Art. A configuration and an operation of the remote supervisory control system were described in Description of the Related Art and their detailed description will be omitted.

FIG. 4(b) is a circuit block diagram of an operating switch wiring device 1, which includes a control unit 1a being made of a microcomputer, an operation input unit 1b having eight individual switches 18 and a group setting switch 19, an address setting unit 1c including an address setting switch 22, a signal input unit 1d for receiving a transmission signal through a signal line Ls, a signal output unit 1e for transmitting the transmission signal through the signal line Ls, a display unit 1f including nine light emitting diodes which are provided in correspondence with the eight individual switches 18 and the group switch 21, and a power supply unit 1g for generating internal power by full-wave rectifying a multi-polar transmission signal Vs transmitted through the signal line Ls.

Figure 1:
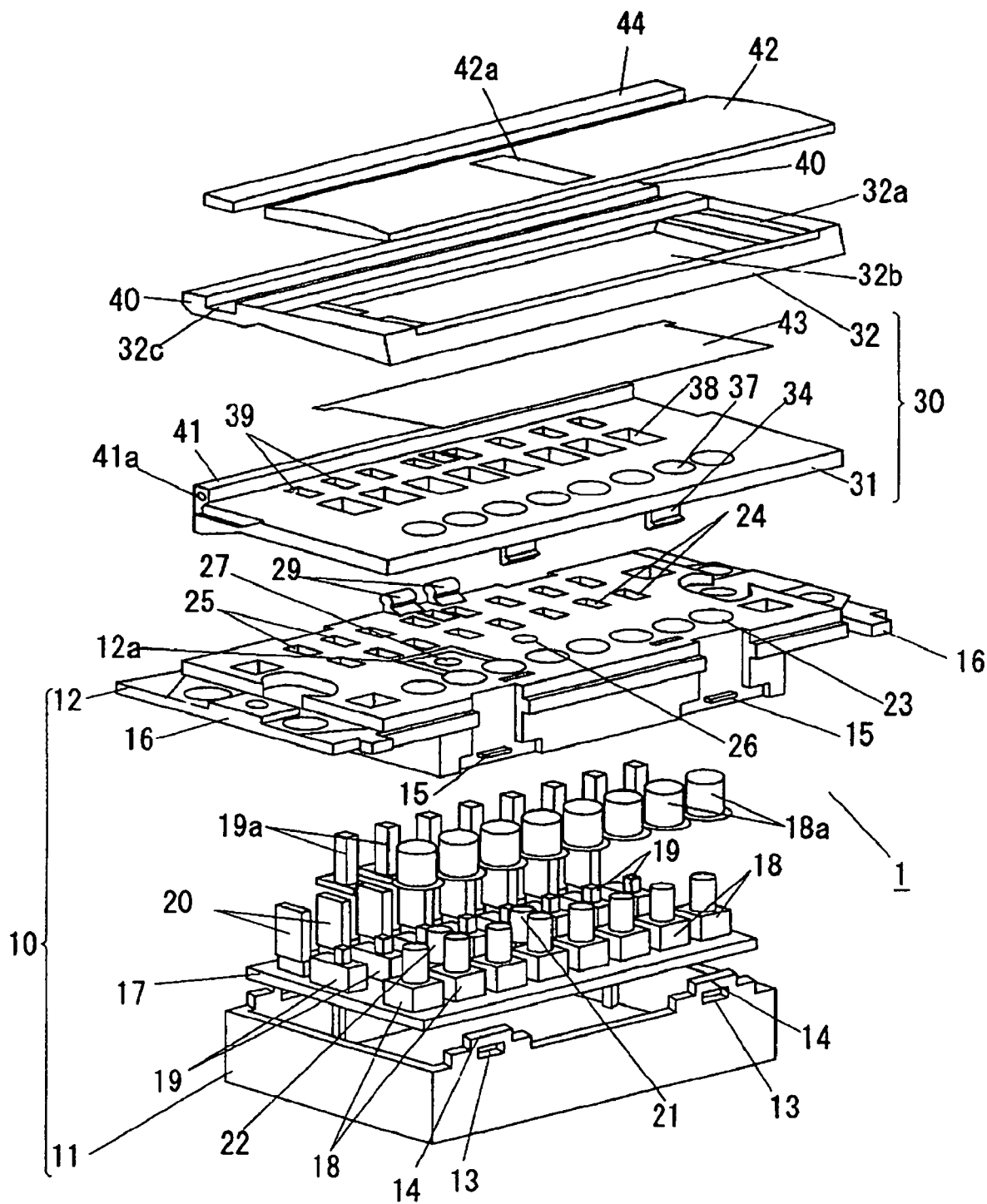
FIG. 1 is an exploded perspective view of an operating switch terminal according to a first embodiment of the present invention.
Figure 2:
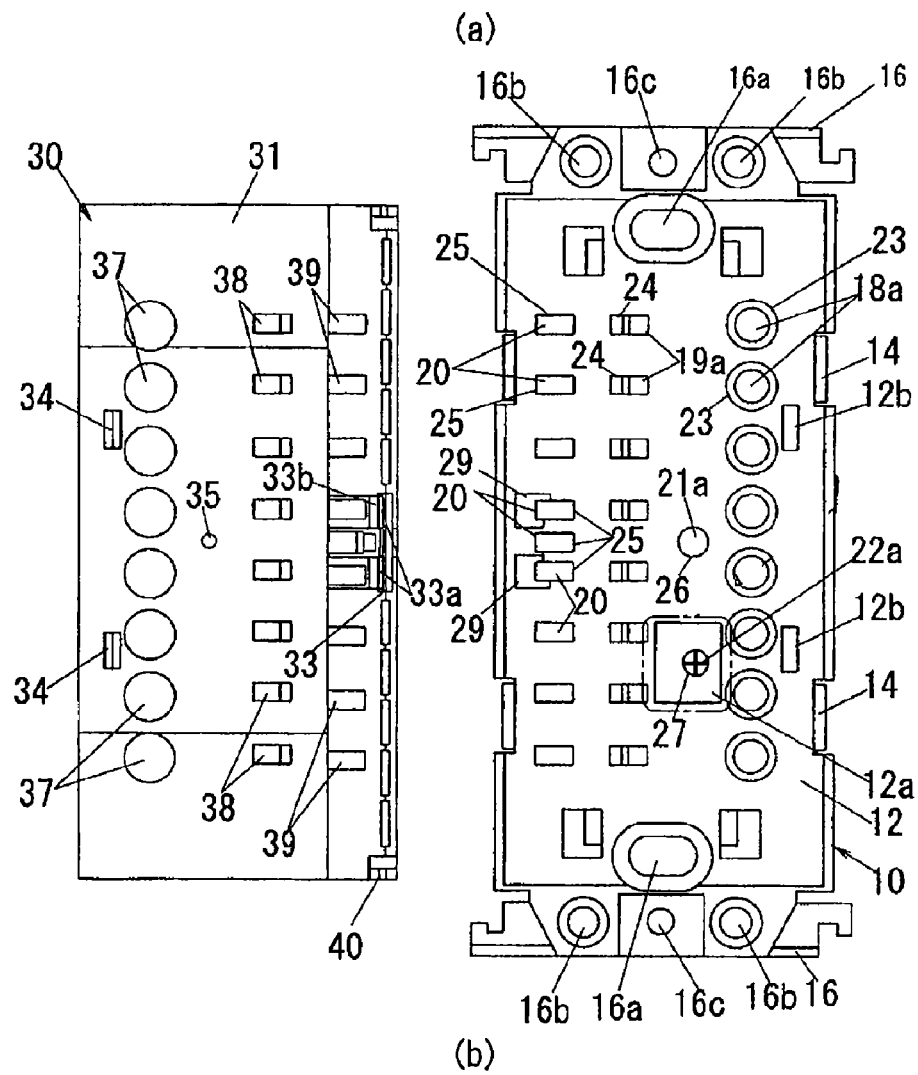
FIG. 2 shows the operating switch terminal according to the first embodiment of the present invention, where

FIG. 1 is an exploded perspective view of the operating switch wiring device 1. A device body 10 of the operating switch wiring device 1 is configured by coupling the body 11 made of synthetic resin with a cover 12, and a handle member 30 is rotatably attached to a front surface of the cover 12. The device body 10 has the substantially the same size as the size (three-module size) of three implanted wiring mechanisms of unit size which are arranged in a short width direction, and can be attached to a series of mounting frames standardized as the implanted wiring mechanism, and is implanted in a construction surface in a state that the front surface thereof is exposed.

The body 11 has a vertically elongate box shape opened in the front surface and a pair of assembling tongues 14 protruded from the front edges of the both sidewalls in a longitudinal direction forwardly. The cover 12 has a vertically elongate box shape opened in the rear surface and a pair of assembling protrusions 15 protruded from the both side walls in the longitudinal direction vertically spacing from each other by, and is coupled with the body 11 by engaging the assembling protrusions 15 with engaging holes 13 provided in the assembling tongues 14.

Figure 15:
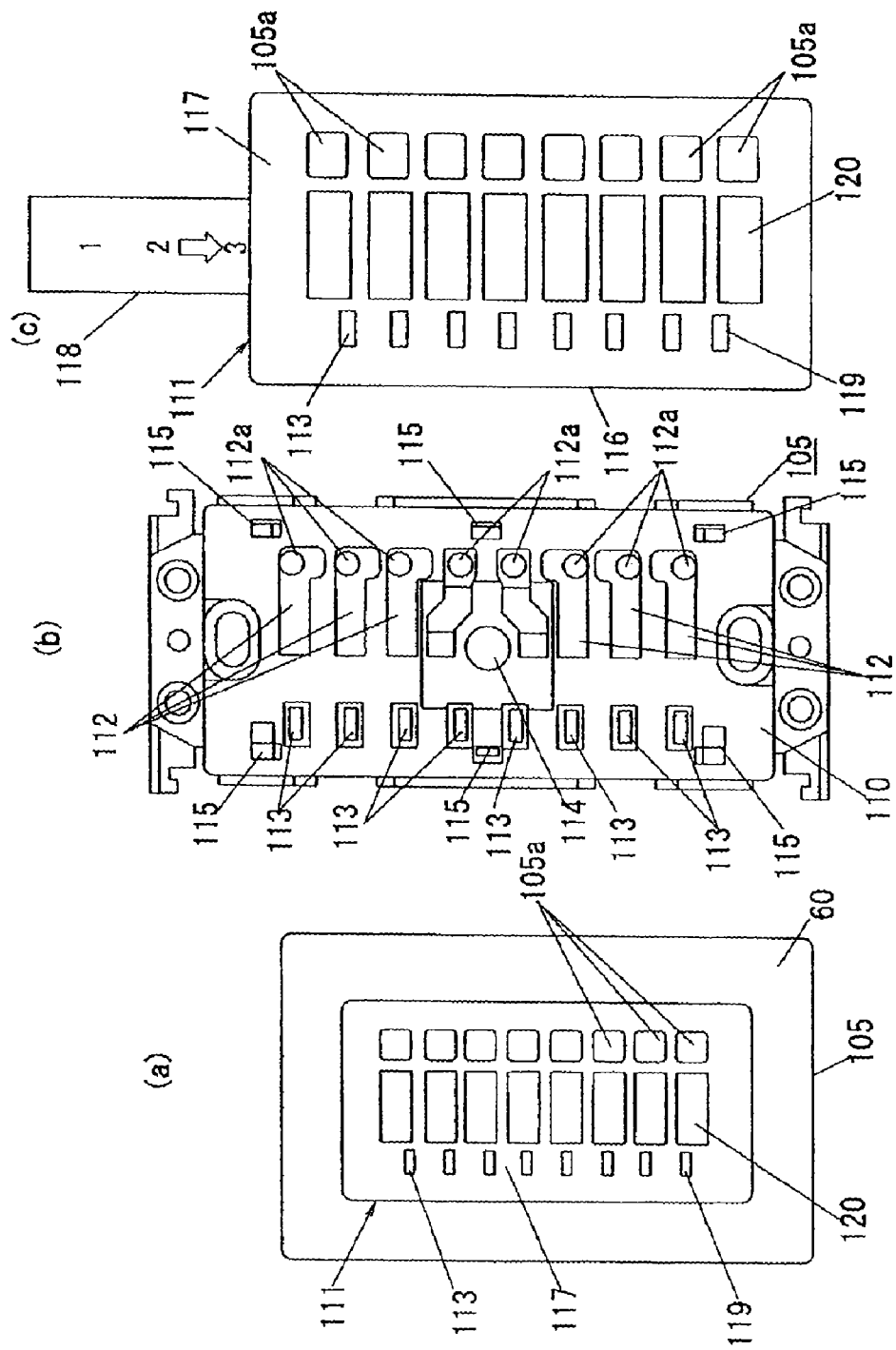

Mounting pieces 16 and 16 are extend from the front edges of the upper and lower side walls of the cover 12 upwardly and downwardly, respectively, and each of the mounting pieces 16 has at least an elongate hole 16a into which a box screw for threadably fixing a implanted box (not shown) implanted in the construction surface is inserted, a screw clearance hole 16b into which a mounting screw for directly mounting the device body 10 to a wall and the like is inserted, and a plate screw hole 16c for attaching a plate 60 (see FIG. 15(a)) having a window hole which exposes the handle member 30 in the front surface.

A circuit board 17 made of a printed circuit board on which circuit parts are mounted is received inside the device body 10, in which the circuit parts include eight individual switches 18 consisting of tact switches, eight group setting switches 19 provided in correspondence with the individual switches 18, a group switch 21 consisting of a tact switch, nine light emitting diodes 20 provided in correspondence with the eight individual switches 18 and the group switch 21, and a rotary switch 22. The plurality of individual switches 18, the group setting switches 19, and the light emitting diodes 20 are vertically arranged on the circuit board 17 in parallel, respectively. In addition, the individual switches 18, the group setting switches 19, and the light emitting diodes 20 are arranged in that order from the right side of the circuit board 17. Furthermore, the group switch 21 and the rotary switch 22 are vertically arranged at a substantially center portion of the horizontal direction in parallel. In addition, a screw terminal 45 for connecting the signal line Ls is provided on the rear surface of the body 11. The circuit board 17 and the signal line Ls are electrically connected to each other through the screw terminal 45.

In the cover 12, eight circular holes 23, into which press buttons 18a (press operation portion) covering operators of the individual switches are passed through to be moved forward and backward, are provided at portions facing the individual switches 18, eight rectangular holes 24, into which slide grips 19a covering operators of the group setting switches 19 are passed through to be slid in the left and right directions, are provided at portions facing the group setting switches 19, and nine perforated holes 25, into which rectangular parallelepiped lens bodies included in the light emitting diodes 20 are passed through, are provided at portions facing the light emitting diodes 20. In addition, in the cover 12, perforated holes 26 and 27, into which the press button 21a (press operation portion) of the group switch 21 and an operator 22a of the rotary switch 22 are passed through, are provided at portions facing the group switch 21 and the rotary switch 22. Furthermore, the operator 22a of the rotary switch 22 has a groove is formed to be rotated by a tool such as a driver. In addition, a rectangular concave portion 12a surrounding the perforated hole 27 is formed in the front surface of the cover 12, an identification plate 28 shown in FIG. 2(b) is attached to the bottom of the concave portion 12a, and the operator 22a of the rotary switch 22 is exposed through a transmission hole 28a formed in the identification plate 28. On the identification plate 28, scales indicating the operation position of the operator 22a and numeral (for example, "1-8", "9-16", and so on.) indicating an address set when the operator is switched, to the respective scales are displayed.

An operating handle 31 for pressing the group switch 21 is rotatably attached to the front surface of the cover 12 to cover a portion except the mounting pieces 16 and 16 on the front surface of the cover 12 (see FIGS. 3A and 3B). A pair of shafts 29 and 29 which protrude obliquely forward in order to pivotably attach the operating handle 31 protrude from the left end of the front surface of the cover 12. The front ends of the shafts 29 and 29 have a cylindrical shape in the longitudinal direction. The operating handle 31 has a rectangular plate shape and is made of synthetic resin. The horizontal size and the vertical size of the operating handle 31 are the substantially same as those of the window hole of the plate 60. A bearing 33 which includes an inserting hole 33a and a bearing spring 33b made of metal and including a metal leaf spring inserted in the inserting hole 33a is provided at a widthwise end of the rear surface of the operating handle 31, as shown in FIG. 2(a). By inserting the shafts 29 and 29 into the inserting hole 33a, the operating handle 31 is supported to pivot on the axis of the shaft 29. In addition, a pair of removal preventing pieces 34 and 34 protrude from the other end of the rear surface of the operating handle 31 backwardly. Each removal preventing piece 34 is inserted into the inside of the cover 12 though the inserting hole 12b formed in the front wall of the cover 12 and the claw of the front end of the removal preventing piece 34 is engaged with the circumference edge portion of the inserting hole 12b, thereby restricting the rotation range of the operating handle 31.

In addition, a press protrusion 35 protrudes from the rear surface of the operating handle 31 at a portion facing the press button 21a of the group switch 21 exposed by the perforated hole 26 of the cover 12. When the right portion of the operating handle 31 is pressed, the operating handle 31 is rotated around the shaft 29, and the press button 21a is pressed by the press protrusion 35 of the operating handle 31 such that the group switch 21 is turned on. When a force applied to the handle member 30 is removed, the operating handle 31 returns to an original position by a reaction force of the bearing spring 33b and the press button 21a such that the group switch 21 is turned off.

Furthermore, in the operating handle 31, circular holes 37 (window holes), into which the press buttons 18a are passed though to be moved forwardly and backwardly, are formed at positions facing the circular holes 23 of the cover 12, rectangular holes 38, into which the slide grips 19a are slidably passed though, are formed at positions facing the rectangular holes 24, and transmission holes 39 are formed at positions facing the perforated holes 25.

In addition, a door 32 for openably and closably covering portions, by which the press buttons 18a, the slide grips 19a, and the light emitting diodes 20 are exposed, is pivotably attached to the operating handle 31. The door 32 has a rectangular plate shape and has arms 40 and 40 laterally protruded as one body from the upper and lower ends of the left side of the door 32. A protruded pedestal 41 protruded more than the other portion of the operating handle 31 is provided at the left end of the operating handle 31 and shaft holes 41a are formed in the upper and lower sides of the protruded pedestal 41. In addition, the door 32 is rotatably attached to the front surface of the operating handle 31 by pivoting a shaft (not shown) provided at the front end of the arm 40 on the shaft holes 41a of the upper and lower sides of the protruded pedestal 41 so as to be put at the position exposing the press buttons 18a, the slide grips 19a, the light emitting diodes 20 and the position covering the press buttons 18a, and the slide grips 19a. In addition, it is preferable that the operating handle 31 or the door 32 has a latch apparatus for the door 32 closed.

Furthermore, an fitting concave portion 32a on to which a name cover 42 having a rectangular plate shape is fitted is formed at the front surface of the door 32. A window hole 32b, which passes through the door 32, is formed in the bottom of the fitting concave portion 32a. When a name card 43 is received in the inserting concave portion 32 from the front surface, when the name cover 42 is fitted in the front surface of the door 32 on to the fitting concave portion 32a at the front surface of the door 32, the name card 43 is held between the edge of the window hole 32b and the name cover 42. Therefore, it is possible to confirm the display of the front surface of the name card 43 through a light transmission window 42a formed at the central portion of the name cover 42 with eyes at the front side and to confirm the display of the rear surface of the name card 43 through the window hole 32b in the fitting concave portion 32a with eyes at the rear side as well. In addition, in the left end of the door 32, a concave groove 32c which extends in the vertical direction is formed at a portion facing the transmission holes 39 formed at a portion facing the transmission holes 39 formed in the operating handle 31. A long display line 44 is inserted into the groove 32c. In the bottom of the concave groove 32c, a window hole 32d, through which the door 32 passes in the thickness direction, is formed at a position facing the light emitting diodes 20 provided in correspondence with the group switch 21. Therefore, it is possible to confirm the light of the light emitting diode through the light transmission window 44a formed in the display line 44 and the window hole 32d, externally.

Next, the order of assembling the operating switch wiring device 1 will be described. First, the assembling of the device body 10 will be described. The assembling of the device body 10 is performed by the steps of installing the circuit board 17, on which the circuit parts are mounted, inside the body 11, covering the front surface of the body 11 with the cover 12, and coupling the body 11 to the cover 12 in a manner of engaging the fitting protrusion 15 with the engaging hole 13 of the fitting tongue 14. At this time, the operators of the individual switches 18 and the group setting switches 19 mounted on the circuit board 17 are covered with the press buttons 18a and the slide grips 19a, respectively, and the press buttons 18a and the slide grips 19a are protruded through the circular holes 23 and the rectangular holes 24 formed in the cover 12 forwardly. Furthermore, the light emitting diodes 20, the press buttons 21a of the group switches 21, and the operator 22a of the rotary switch 22 are exposed to the front surface of the cover 12 through the perforated holes 25, 26, and 27. Next, the assembling of the handle member 30 will be described. The assembling of the handle member 30 is performed by the steps of, in a state that the name card 43 is received in the fitting concave 32a of the door 32, inserting the name cover 42 fitted into the fitting concave 32a at the front surface, inserting the display line 44 into the concave groove 32c to be fixed to the door 32, and rotatably attaching the door 32 to be rotatable the front surface of the operating handle 31. After the assembling of the device body 10 and the assembling of the handle member 30 are completed, the assembling of the operating switch wiring device 1 is performed by covering with the handle member 30 the front surface of the device body 10, inserting the shaft 29 of the device body 10 into the bearing 33 provided on the rear surface of the operating handle 31, and attaching the handle member 30 to be rotatable to the front surface of the device body 10, to be rotatable in a manner of inserting the removal preventing piece 34 of the operating handle 31 into the inserting hole 12b of the cover 12.

FIG. 3 shows a state that the assembling of the operating switch wiring device 1 is completed. When the door is opened as shown in FIG. 3(b), the press buttons 18a of the individual switches 18 and the slide grips 19a of the group setting switches 19 can be operated or a lighting state of the light emitting diodes 20 can be confirmed. The eight individual switches 18 are provided in the operating switch wiring device 1 and the addresses of the individual switches 18 correspond to the addresses of the relays included in the control parent device 101 or the control child device 102 such that the relays can be opened and closed by the operation of the individual switches 18. In the remote supervisory control system using the operating switch wiring device 1, 48 relays can be controlled. Also, a group of relays can be operated by a single operating switch wiring device 1 by dividing 48 relays into six groups by eight. Here, since the addresses of 1 to 48 are assigned to the 48 relays, one group is controlled by one operating switch wiring device 1 by grouping, for example, the relays having the address numbers of 1 to 8, 9 to 16, 17 to 24, 25 to 32, 33 to 40, or 41 to 48 in a group, respectively. Furthermore, since continuous addresses are assigned to the eight individual switches 18 included in the operating switch wiring device 1 in the ascending order, the leading address (address of the uppermost individual switch 18) is changed to eight values of 1, 9, 17, 25, 33, and 41 and a combination of the addresses of the eight operating switches 18 is changed and set to any one of 1 to 8, 9 to 16, . . . , and 41 to 48 by rotating the operator 22a of the rotary switch 22 using a tool such as a driver in a state that the handle member 30 is detached.

Furthermore, when the press buttons 18a of the individual switches 18 are pressed in a state that the door 32 is opened, an operation input from the pressed individual switches 18 is given to the control unit 1a, and the transmission signal Vs having the addresses of the pressed individual switches 18 as the monitoring data is transmitted from the signal outputting unit 1e to the control parent device 101 by the above-described interrupt process. At this time, in the control parent device 101, when the addresses included in the received transmission signal Vs are identical to the addresses of the relays included in the control parent device 101, the opening/closing state of the relays is controlled, and, otherwise, a control signal is transmitted to the corresponding control child device 102 to open/close the relays having the corresponding addresses by the control child device 102. Thereafter, since a control state of the corresponding relays is carried from the control parent device 101 to the operating switch wiring device 1, the control unit 1a turns on/off the light emitting diodes 20 corresponding to the pressed individual switches 18 and thus the opening/closing states of the corresponding relays (that is, ON/OFF state of the load) can be displayed.

In addition, when the door 32 is opened, the group setting switches can be operated. Thus, by sliding the slide grips 19a of the group setting switches 19, it can be set whether the individual switches 18 are included in the collective control object. For example, when any slide grip 19a is slid to the right end, the individual switch 18 corresponding thereto is registered in a group of the collective control object, and, when any slide grip 19a is slid to the left end, the individual switch 18 corresponding thereto is removed from the group of the collective control object.

Furthermore, when the right portion of the handle member 30 (that is, the door 32) is pressed in a state that the door 32 is closed as shown in FIG. 3(a), the handle member 30 is rotated on the shaft 29 and the press button 21a of the group switch 21 is pressed by the press protrusion 35 provided on the rear surface of the operating handle 31. Thus, the operation input from the group switch 21 is given to the control unit 1a. At this time, the control unit 1a detects setting states of each group setting switches 19, transmits the addresses of the individual switches 18 registered in the group by the group setting switches 19 using the transmission signal Vs, allows the control parent device 101 to perform the above-described process, and controls the relays corresponding to the individual switches registered in the group.

As described above, in the present embodiment, it is possible to individually turn on/off the relays using the plurality (for example, eight) of individual switches 18 included in the operating switch wiring device 1 and to collectively turn on/off the relays corresponding to the plurality of the individual switches by pressing the group setting switches 19 using the handle member 30 as well. In addition, since it is possible to set whether the individual switches 18 are registered in the group using the group setting switches 19 included in the operating switch wiring device 1, the group can be set using the operating switch wiring device without using the dedicated setter for setting the group. Thus, an unskilled worker can easily set the group. Furthermore, since the remote supervisory control system performs a general control operation upon setting, a state that the control cannot be performed upon setting does not occur.

Second Embodiment

Figure 5:
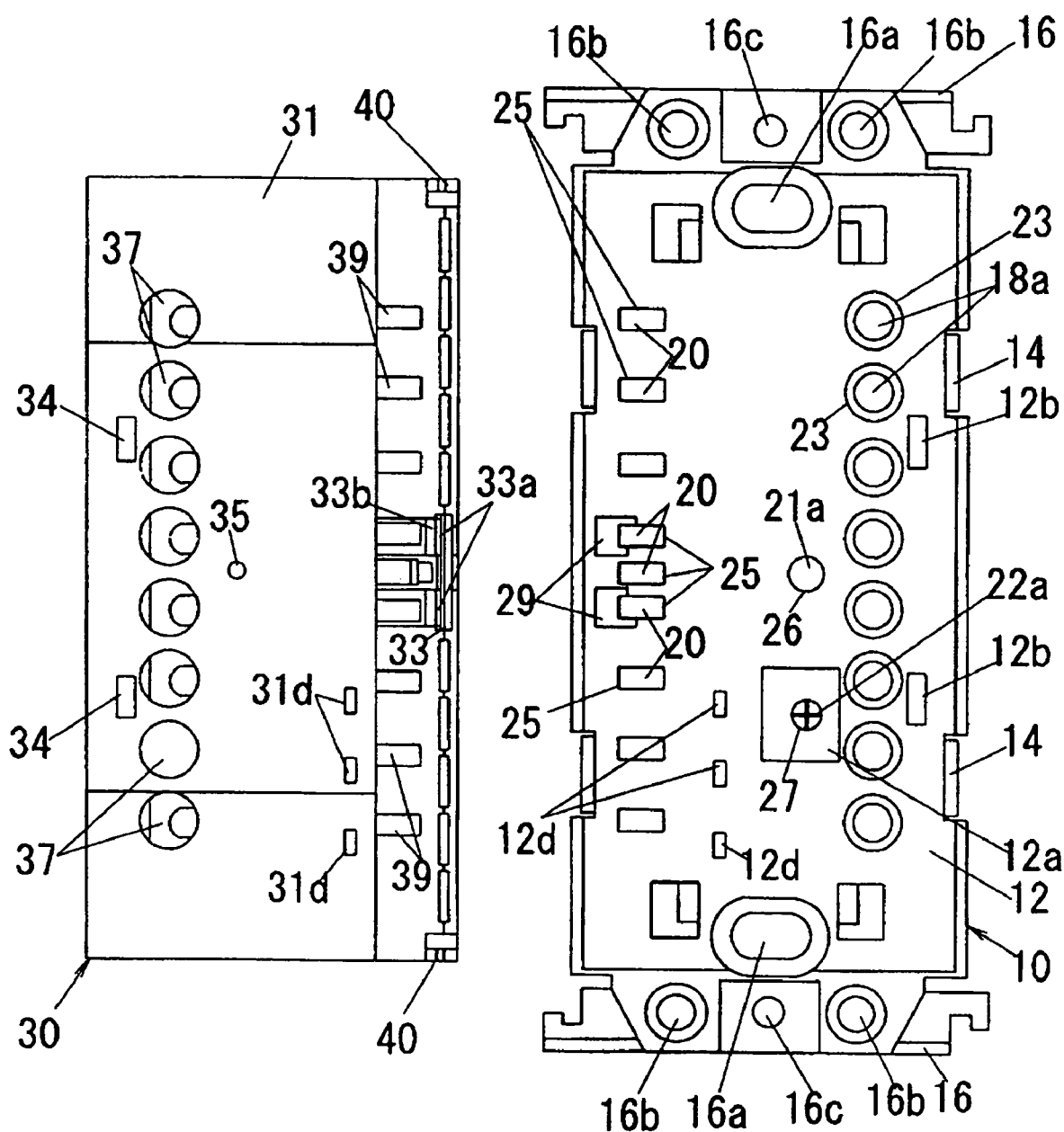
FIG. 5 shows an operating switch terminal of a second embodiment of the present invention in a state of detaching a handle member.

An operating switch wiring device according to a second embodiment of the present invention will be described with reference to FIGS. 5 to 7. The group setting switches 19 are disposed on the front surface of the device body 10 in the first embodiment, whereas the group setting switches are disposed on the handle member 30 in the present embodiment. The present embodiment is similar to the first embodiment except the arrangement of the group setting switches. Thus, the same components are denoted by the same reference numerals and thus their description will be omitted.

In the present embodiment, since the group setting switches 19 are disposed on the handle member 30, the group setting switches 19 are not mounted on the circuit board 17 received in the device body 10 and also the rectangular holes 24 for passing through the slide grips 19a of the group setting switches 19 are not formed in the cover 12.

Next, a configuration of the handle member 30 will be described. The handle member 30 includes the operating handle 31 and the door 32. The operating handle 31 made of synthetic resin, and has a rectangular plate shape and the substantially same horizontal and vertical sizes as those of the window hole of the plate 60. The operating handle 31 has a bearing 33 provided at the left end of the rear surface of the operating handle 31, a pair of removal preventing pieces 34 and 34 provided at the right end thereof, and the press protrusion 35 is protruded at a position facing the press button 21a of the group switch 21 in the substantially center of the rear surface thereof. In addition, the operating handle 31 has circular holes 37 for passing through press buttons 18a passes to be moved forwardly and backwardly formed at positions facing the circular holes 23 of the cover 12, transparent holes 39 are formed at positions facing the perforated holes 25, and three cable perforated-holes 31d are vertically formed in the lower side of the bearing 33 in parallel. In addition, a rectangular receiving concave portion 31c is formed in the front surface of the operating handle 31 and a rectangular-plate-shaped name member 50 for displaying the use of the individual switches 18 is inserted into the receiving concave portion 31c (see FIG. 6). In the name member 50, three cable perforated-holes 50a are formed to be connected to the cable perforated holes 31d and circular holes 50b for exposing the press buttons 18a of the individual switches 18 are formed.

The door 32 has a fitting concave portion 32a and a concave groove 32c formed rectangularly caved in the front surface of the door 32 and the name cover 42 and the display line 44 are fitted into the inserting concave portion 32a and the concave groove 32c, respectively. In addition, the circuit board 46 made of a printed circuit board on which the eight group setting switches 19 are mounted and a door cover 48 receiving the eight slide operating pieces 47 for operating the group setting switches 19 are attached to the rear surface of the door 32. Each slide operating piece 47 is shaped like a substantially T-shape and has a circular operating protrusion 47a (press operator) formed on a rear surface of a wide portion of the slide operating piece 47. The door cover 48 is shaped like a rectangular flat plate and has a rectangular receiving concave portion 48b rectangularly caved in the front surface of the door cover 48. Nine protrusions 48c which extend along a short width direction are vertically formed at the bottom of the receiving concave portion 48b in parallel, and elongate perforated holes 48a are formed at the middle portions of the adjacent two protrusions 48c.

In addition, when the door cover 48 is fixed to the door 32 in a state that the slide operating pieces 47 are disposed between the adjacent two protrusions 48c provided on the receiving concave portion 48b and the circuit board 46 is laminated thereon, since the slide operating pieces 47 are guided from the upper and lower sides by the two protrusions 48c. It is possible to slide the slide operating pieces 47 in the horizontal direction. In addition, the operating protrusions 47a formed on the rear surfaces of the slide operating pieces 47 are exposed to the perforated hole 48a of the door cover 48. The circuit board 46 is electrically connected to the circuit board 17 received in the device body 10 through a cable 49. Furthermore, a circuit for detecting the switching states of the group setting switches 19 is formed on the circuit board 46 and receives power from the circuit board 17 through the cable 49 and outputs the detected result to the circuit board 17 through the cable 49. In addition, the cable 49 connected to the circuit board 46 passes through a cable perforated-hole 48d formed in the door cover 48, the respective cable perforated-holes 50a and 31d formed in the name member 50 and the operating handle 31, and the cable perforated-hole 12d formed in the front surface of the cover 12 to be connected to the circuit board 17 received in the device body 10. The door 32 is rotatably attached to the operating handle 31 and the operating handle 31 is rotatably attached to the front surface of the device body 10.

Figure 6:
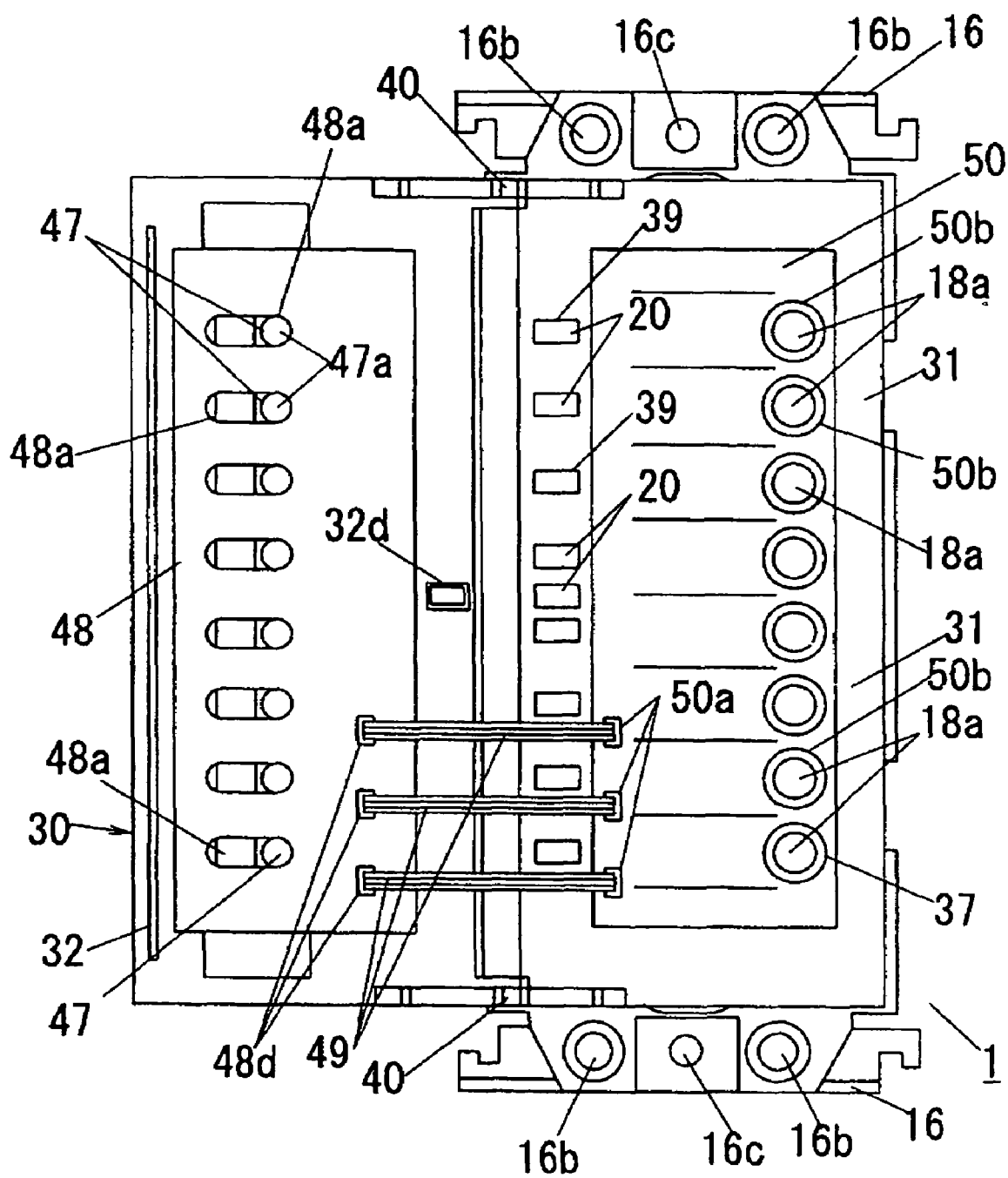
FIG. 6 is a front view of the operating switch terminal according to the second embodiment of the present invention in a state of opening a door.
Figure 7:
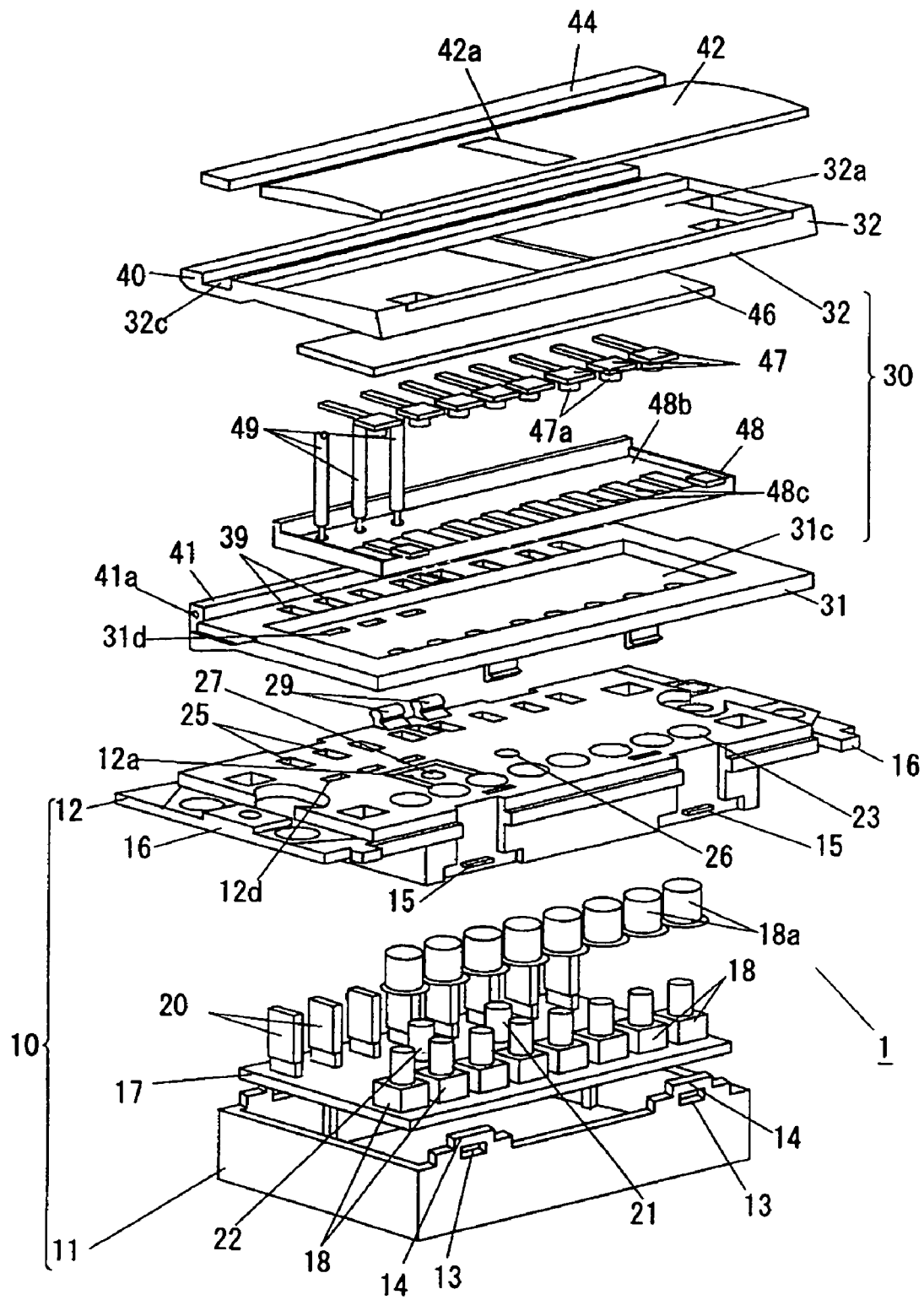
FIG. 7 is an exploded perspective view of the operating switch terminal according to the second embodiment of the present invention.

As shown in FIG. 6, when the door is opened, the operating protrusions 47a of the slide operating pieces 47 are able to operate, when the operating protrusions 47a are slid, the settings of the group setting switches (not shown) are switched. Thus, it is possible to set whether the individual switches 18 are included in the collective control object. For example, when the operating protrusions 47a are slid to the right end of the perforated holes 48a in FIG. 6 the individual switches 18 corresponding thereto are removed from the group of the collective control object. Accordingly, it is possible to set whether each of the individual switches 18 is registered in the group. The door 32 needs to be closed, when the setting is completed.

The operation of the operating switch wiring device 1 of the present embodiment is similar to that of the first embodiment and thus their description will be omitted. In the first embodiment, since the slide grips 19a for operating the group setting switches 19 are disposed at the front side of the cover 12 together with the press buttons 18a of the individual 18 or the light emitting diodes 20, the size or the stroke of the slide grip 19a is restricted. In contrast, in the present embodiment, the slide operating pieces 47 for operating the group setting switches 19 are held on the door 32 and the operating protrusions 47a of the slide operating pieces 47 are disposed at the back side of the door 32, the size or the stroke of the operating protrusions 47a can sufficiently increase. Accordingly, operability is improved.

In addition, in the first embodiment, since the slide grips 19a of the group setting switches 19 are disposed adjacent to the press buttons 18a of the individual switches 18, the name card 43 for displaying the use of the individual switch 18 is disposed at the rear surface of the door 32. In contrast, in the present embodiment, since the group setting switches 19 are disposed on the door 32, an empty space is generated in the front surface of the operating handle 31. Accordingly, the name member 50 for displaying the use of the individual switches 18 is attached in the empty space such that the display of the name member 50 can be disposed adjacent to the press buttons 18a of the individual switches 18 (see FIG. 6). Thus, when the individual switches 18 are operated, it is easy to see the display of the name member 50.

Third Embodiment

Figure 9:
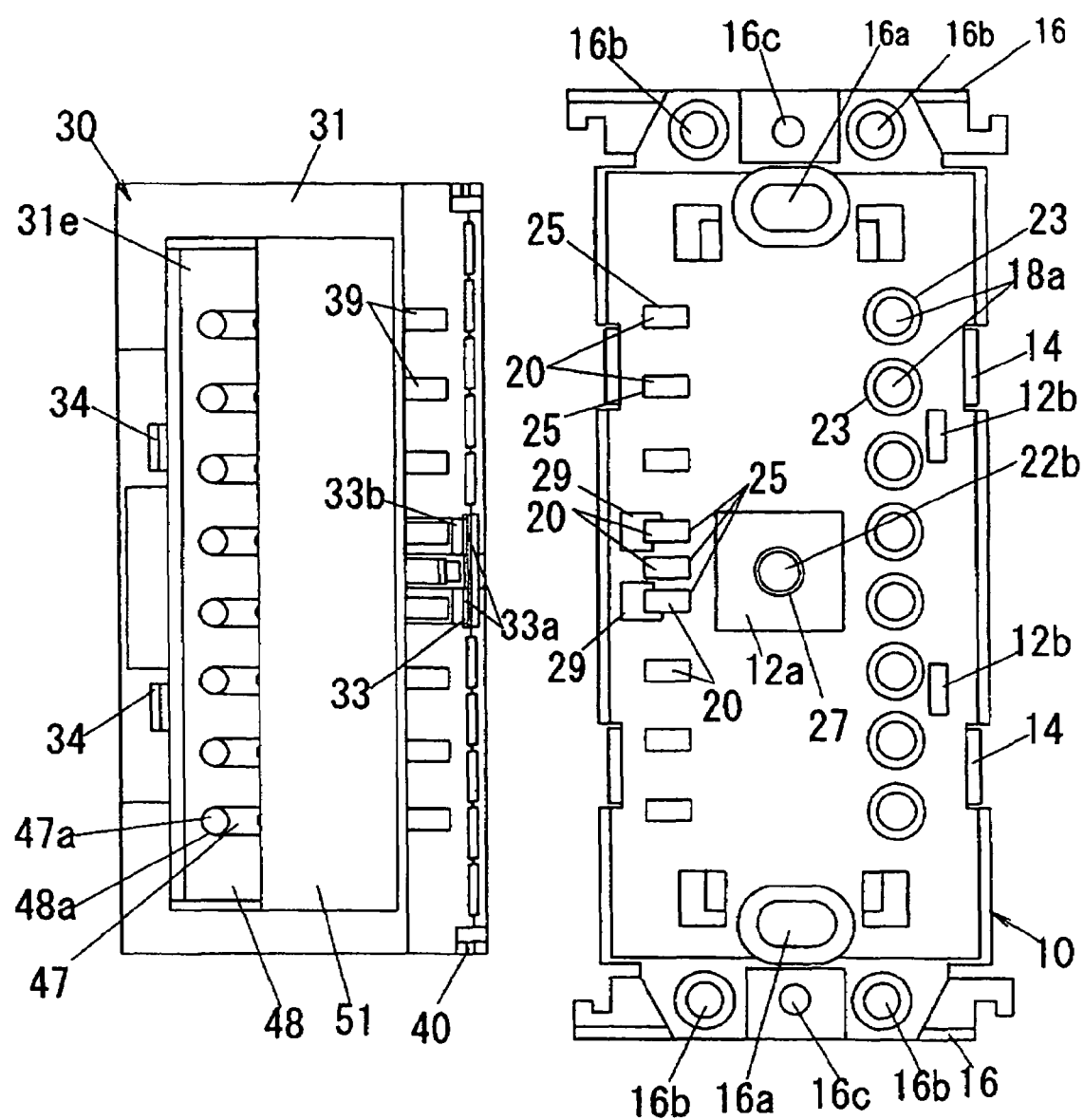
FIG. 9 shows the operating switch terminal according to according to the third embodiment of the present invention in a state of detaching a handle member.
Figure 10:
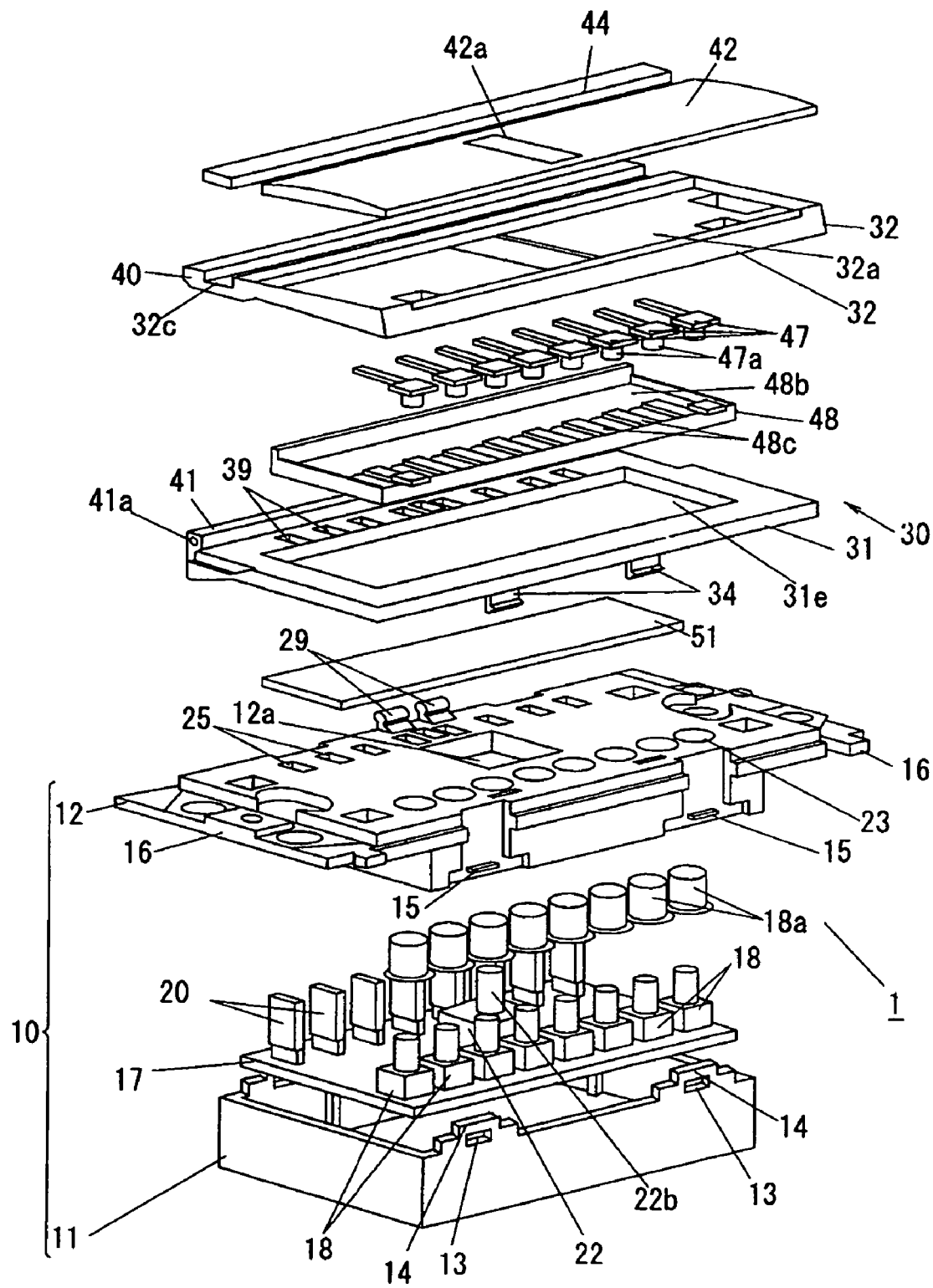
FIG. 10 is an exploded perspective view of the operating switch terminal according to the third embodiment of the present invention.

An operating switch wiring device according to a third embodiment of the present invention will be described with reference to FIGS. 8 to 10. In the second embodiment, the group switch 21 is provided independent of the individual switches 18, whereas, in the present embodiment, the individual switches 18 serve for the group switch 21 too. The basic configuration of the operating switch wiring device 1 is substantially similar to the second embodiment. Accordingly, the same components are denoted by the same reference numerals and thus the description will be omitted.

In the present embodiment, since the individual switches 18 serve for the group switch 21 too, the group switch 21 is not mounted on the circuit board 17 received in the device body 10 and the perforated hole 26 for exposing the press button 21a of the group switch 21 is not formed. Accordingly, it is permitted to use a rotary switch 22 as that has a large size, by protruding a rotation grip 22b of the rotary switch 22 into the concave portion 12a deeply caved in the front surface of the cover 12, it can operate for setting the address by rotating the rotation grip 22b by hand.

Next, a configuration of the handle member 30 will be described. The handle member 30 includes an operating handle 31 and a door 32. The operating handle 31 is made of synthetic resin in the shape of a rectangular plate and has the substantially same horizontal and vertical sizes as those of the window hole of the plate. The bearing 33 is mounted at the left end of the rear surface of the operating handle 31 and a pair of removal preventing pieces 34 and 34 is provided at the right end thereof. A transmission hole 39 is formed in the operating handle 31 at a position facing the perforated holes 25. In addition, an elongate window hole 31e is formed at the center of the operating handle 31. The press buttons 18a of the individual switches 18 can be operated though the window hole 31e. A name card 51 for displaying the use of the individual switches 18 is attached to the rear surface of the operating handle 31 to block the window hole 31e except a portion facing the press buttons 18a.

Meanwhile, the fitting concave portion 32a and the concave groove 32c, which are rectangularly caved, are formed in the front surface of the door 32 and the name cover 42 and the display line 44 are fitted into the fitting concave portion 32a and the concave groove 32, respectively. In addition, a door cover 48, which receives the eight slide operating pieces 47, is attached to the rear surface of the door 32. Each slide operating piece 47 has a substantially T-shape and a circular operating protrusion 47a (press operator) is protruded formed on the rear surface of a wide portion. The door cover 48 is shaped like a rectangular flat plate and has a receiving concave portion 48b rectangularly caved in the front surface of the door cover 48. Nine protrusions 48c which extend along a short width direction are vertically formed at the bottom of the receiving concave portion 48b in parallel, and elongate perforated holes 48a are formed at the middle portions of the adjacent two protrusions 48c.

In addition, when the door cover 48 is fixed to the door 32 in a state that the slide operating pieces 47 are disposed between the adjacent two protrusions 48c provided on the receiving concave portion 48b, the slide operating pieces 47 are guided from the upper and lower sides by the two protrusions 48c. Thus, the slide operating pieces 47 can be slid in the horizontal direction. In addition, the operating protrusions 47a formed on the rear surfaces of the slide operating pieces 47 are exposed to the perforated holes 48a of the door cover 48. By sliding the operating protrusions 47a by the hand, the positions of the operating protrusions 47a can be moved between two positions facing or separating from the press buttons 18a of the individual switches 18. The protrusion amount of the operating protrusions 47a is set to a size in which the operating protrusions 47a does not come in contact with the press buttons 18a in a state that the handle member 30 is not pressed and the operating protrusions 47a press the press buttons 18a in a state that the handle member 30 is pressed when the operating protrusions 47a are slid to the position facing the press buttons 18a, and the handle member does not come in contact with the front surface of the cover 12 although the handle member 30 is pressed when the operating protrusions 47a are slid to the position separating from the press buttons 18a. In addition, since the window hole 31e formed in the operating handle 31 is slightly wider than a portion facing the door cover 48, the operating protrusions 47a does not interfere with the operating handle 31 when the operating protrusions 47a are slid to the position separating from the press buttons 18a. The door 32 is rotatably attached to the operating handle 31 and the operating handle 31 is rotatably attached to the front surface of the device body 10.

Figure 8:
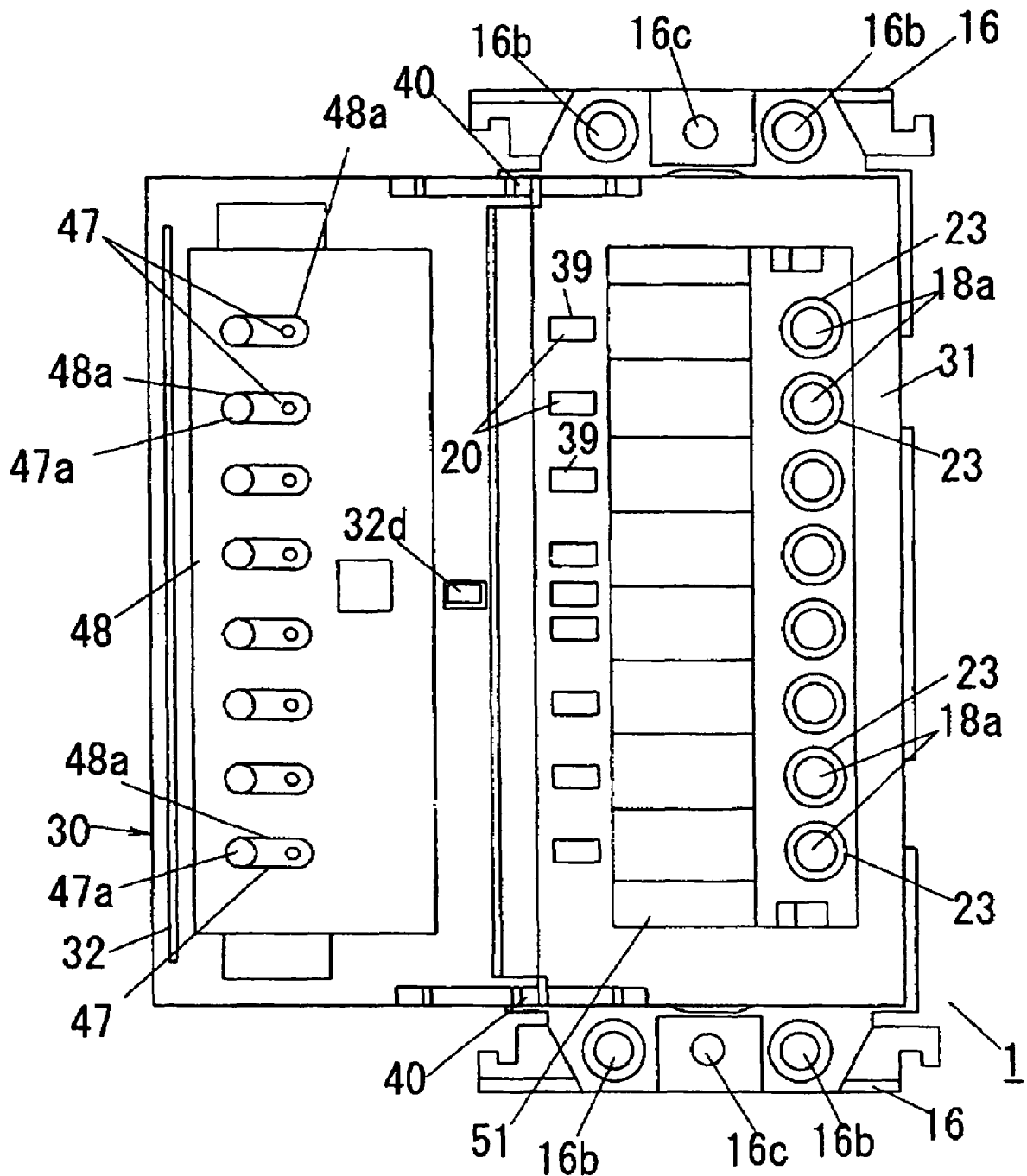
FIG. 8 is a front view of an operating switch terminal of a third embodiment of the present invention in a state of opening a door.

As shown in FIG. 8, the operating protrusions 47a of the slide operating pieces 47 can be operated in a state that the door 32 is opened. By sliding the operating protrusions 47a, it is determined the corresponding individual switches 18 can be included in an object of group control. For example, when the operating protrusions 47a are slid to the left end of FIG. 8 in the perforated holes 48a, since the operating protrusions 47a face the press buttons 18a of the individual switches 18 in a state that the door 32 is closed, the corresponding individual switch 18 is registered in a group of the collective control object. Meanwhile, when the operating protrusions 47a are slid to the right end of FIG. 8, since the operating protrusions 47a do not face the press buttons 18a of the individual switches 18 in a state that the door 32 is closed, the corresponding individual switches are removed from the group of the collective control object. Thus, it can be set whether the individual switches 18 are registered in the group. The door 32 needs to be closed when the setting is completed.

In addition, when the handle member 30 is pressed in the state that the door is closed by the operating protrusions 47a slid to the position facing the press buttons 18a of the individual switches 18, the press buttons 18a of the individual switches 18 are pressed, and the operation input from the pressed individual switches 18 is supplied to the control unit 1a. When the operation input is received from a plurality of individual switches 18, the control unit 1a determines that the plurality of individual switches 18 are registered in a group control object, transmits the addresses of the individual switches 18 registered in the group from the signal output unit 1e to the control parent device 101 through the above-described interrupt process using the transmission signal Vs, and allows that the control parent device 101 controls the relays corresponding to the individual switches registered in the group by performing the above-described process. In addition, when the individual switches 18 are desired to be individually operated, a desired press button 18a of the individual switch 18 needs to be pressed through the window hole 31e of the operating handle 31 in a state that the door 32 is opened.

In the present embodiment, since the plurality of operating protrusions 47a (slide operating pieces 47), which face the press buttons 18a of the individual switches 18, respectively and can be moved between the position pressing the press button 18a according to the rotation of the operating handle 31 and the position separating from the press buttons 18a, are provided on the rear surface of the door 32 and the plurality of slide operating pieces 47 configure a group setting means, the plurality of individual switches 18 can double as the group switch 21. Accordingly, it is possible to remove the group switch 21 and to reduce the number of the parts and the cost thereof. In addition, since the group setting means is composed of the mechanical slide operating pieces 47, a switch or a wiring is unnecessary and it possible to device the overall cost retrenchment, compared with the second embodiment in which the group setting means is composed of the electrical switch. Furthermore, since it is set whether the individual switches 18 are registered in the group using the operating protrusions 47a (group setting means) of the slide operating pieces 47 provided in correspondence with the individual switches 18, a setter for setting the group is unnecessary and a unskilled worker can easily set the group and the remote supervisory control system can perform a general control operation during setting.

In addition, similar to the second embodiment, since the slide operating pieces 47 as the group setting means are held on the door 32 and the operating protrusions 47a of the slide operating pieces 47 are disposed at the back side of the door 32, the size or the stroke of the operating protrusions 47a can sufficiently increase. Accordingly, operability is improved. In addition, in the first embodiment, since the slide grips 19a of the group setting switches 19 are disposed adjacent to the press buttons 18a of the individual switches 18, the name card 43 for displaying the use of the individual switches 18 is disposed at the rear surface of the door 32. In contrast, in the present embodiment, since the slide operating pieces 47 are disposed on the door 32 side, and an empty space is left in the front surface of the operating handle 31 side. Accordingly, the name member 50 for displaying the use of the individual switches 18 is attached in the empty space such that the display of the name card 51 can be disposed adjacent to the press buttons 18a of the individual switches 18. Thus, when the individual switches 18 are operated, it is easy to see the display of the name card 51.

Fourth Embodiment

Figure 11:
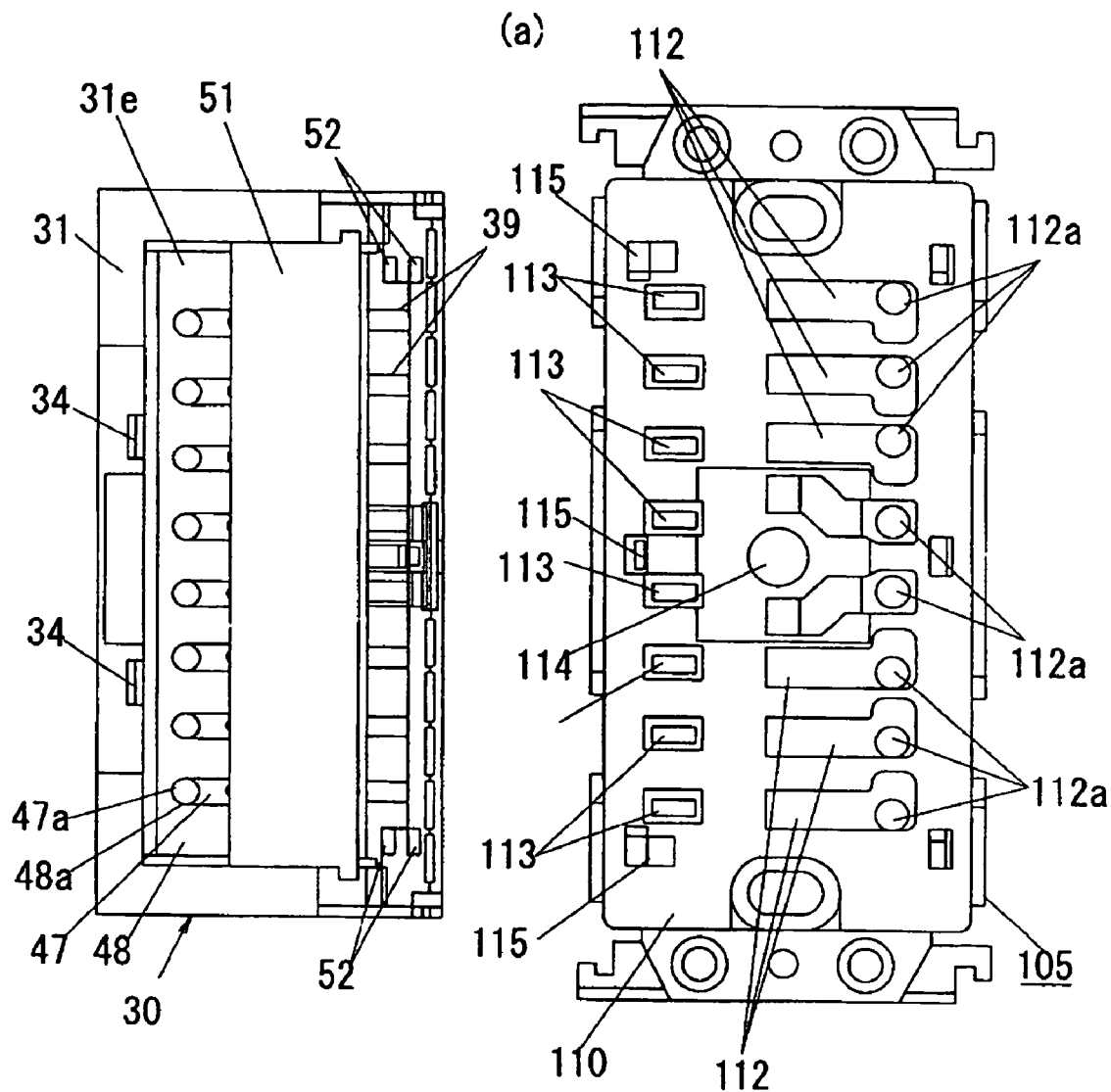
FIG. 11 shows a handle member according to a fourth embodiment of the present invention, where
Figure 11:
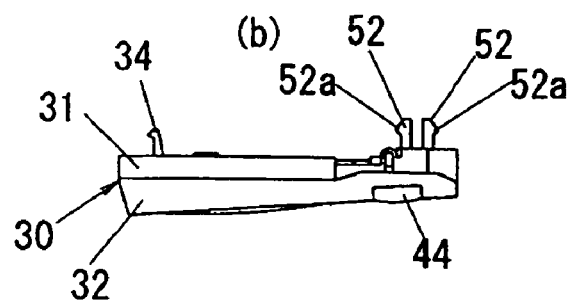

A handle member 30 according to an embodiment of the present invention will be described with reference to FIG. 11. The handle member 30 according to the present embodiment is used in the above-described operating switch wiring device. In the handle member 30 described in the third embodiment, two pairs of elastic engagement pieces 52 protruded to the rear from one widthwise end (bearing 33 side) of the rear surface of the operating handle 31 are provided at the upper and lower sides thereof. The device body 110 of the operating switch wiring device 105 is covered with the handle member 30 on the front surface thereof, an elastic engagement pieces 52 are inserted into engagement holes 115 formed in the device body 110, and the claws 52a provided on the front ends of the elastic engagement pieces 52 are engaged with the hole edge of the engagement holes 115, thereby rotatably attaching the handle member 30 to the device body 110 of the operating switch wiring device 1. When the operating protrusions 47a are slid to positions facing the press buttons 112a of the individual switches, the protrusion amount of the elastic engagement piece 52 is set to a value in which the operating protrusions 47a do not come in contact with the press buttons 112a in a state that the handle member 30 is attached to the device body 110 of the operating switch wiring device 105 and the operating protrusions 47a press the press buttons 112a in a state that one side of the handle member 30 is pressed to rotate the handle member 30. In addition, the configuration of the handle member 30 except the elastic engagement pieces 52 is similar to that of the third embodiment and thus the same components are denoted by the same reference numerals.

In the present embodiment, when the handle member 30 configured by rotatably attaching the door 32 on the front surface of the operating handle 31 is attached to the device body 10 of the existing operating switch wiring device 105 using the elastic engagement pieces 52 which is an attaching means, since the operating protrusions 47a (press operator) provided on the operating handle 31 collectively press the press buttons 112a of the individual switches registered in the group by rotating the operating handle 31, by only attaching the handle member 30 to the existing operating switch wiring device 105 including the plurality of individual switches, it is possible to easily control a group function. In addition, since the slide operating pieces 47 are slidably provided on the door 32 attached to the operating handle 31 and it is set whether each of the individual switches is registered in the group using the operating protrusions 47a (group setting means) of the slide operating pieces 47, a setter for setting the group is unnecessary and a unskilled worker can easily set the group and the remote supervisory control system can perform a general control operation during setting.

Fifth Embodiment

Figure 12:
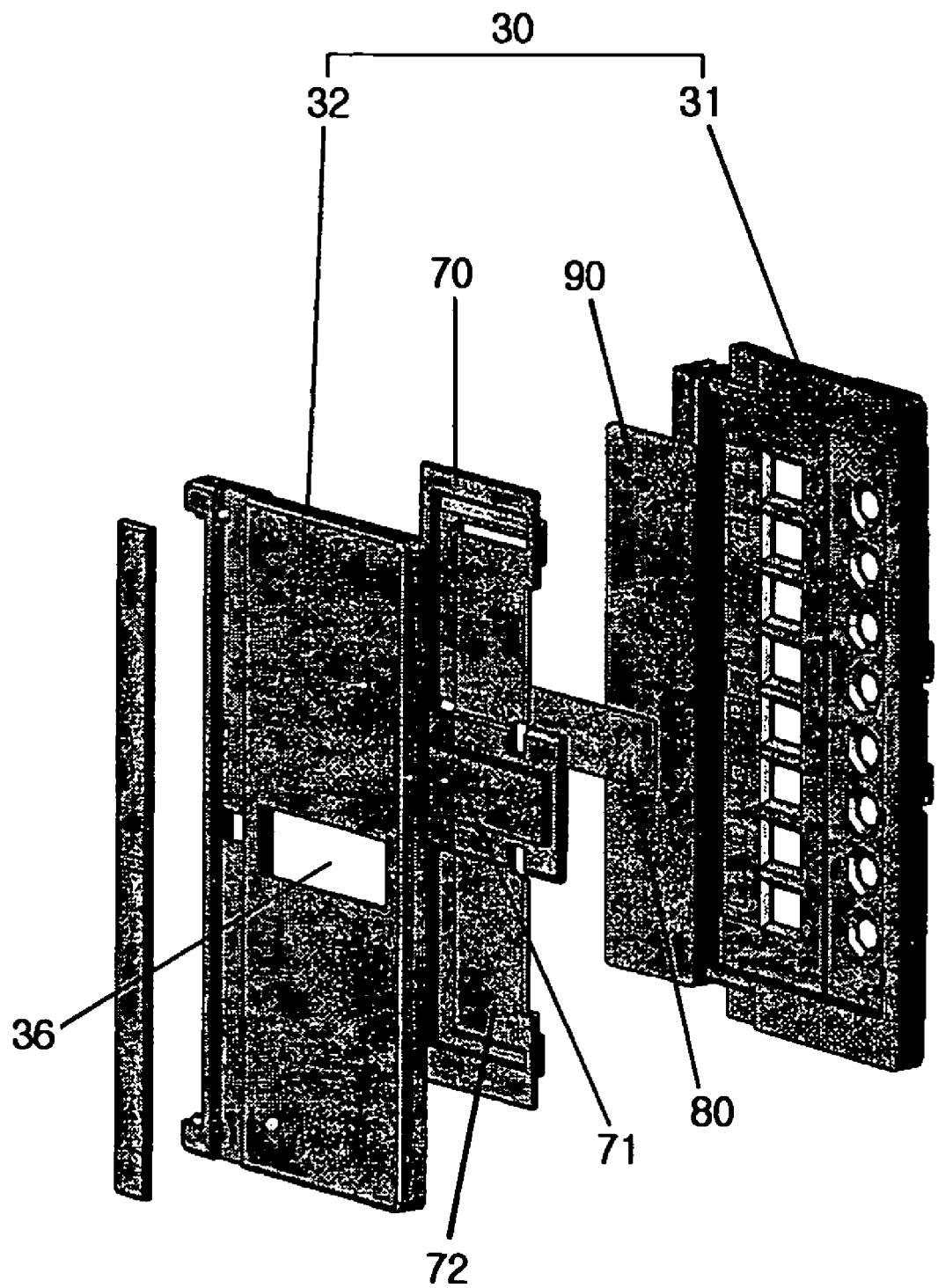
FIG. 12 is an exploded perspective view of a handle member according to the fifth embodiment of the present invention.

A handle member 30 according to the other embodiment of the present invention will be described with reference to FIGS. 12 and 13. The handle member 30 according to this embodiment can be applied to the operating switch wiring device described in the first embodiment. The first embodiment use a name card on the front surface thereof to mark area name indicating the remote controlling area and on the rear surface thereof to mark individual names indicating the remote controlling objects. This embodiment is characterized in using two cards, that is, an area name card 80 and an individual name card 90 for marking the area name and individual name respectively.

In the present embodiment, the handle member 30 includes an operating handle 31, a door 32, and a name card holder 70. The operating handle 31 is the same as that described in the first embodiment, and thus their description will be omitted. The door 32 has a hole 36 for seeing through on the substantially central portion of the front surface thereof. The front surface of the door 32 may be formed as one body or combined with the separate name cover member as described in the first embodiment. The card holder 70 is attached to the rear surface of the door 32 by an adhesive or by assembling or screwing, etc. The card holder 70, which is made of a transparent synthetic resin, consists of an area card holding part 71 for holding the area name card 80 and an individual card holding part 72 for holding the individual name card 90. The area card holding part 71 of the card holder 70 is formed at front side central portion of the individual card holding part in horizontally elongate rectangular plate shape, in which the front surface thereof is convex to fit in the hole 36 of the door 32, the rear surface thereof is concave to receive and hold the area name card 80. The individual card holding part 72 of the card holder 70 is formed in vertically elongate rectangular plate shape, and has edge holders 73 formed at edges on the rear surface thereof in which the upper side edge holder of them is opened to receive the individual name card 90 being inserted from upper side (see FIG. 13(*a*) and FIG. 13(*b*)).

Figure 13:
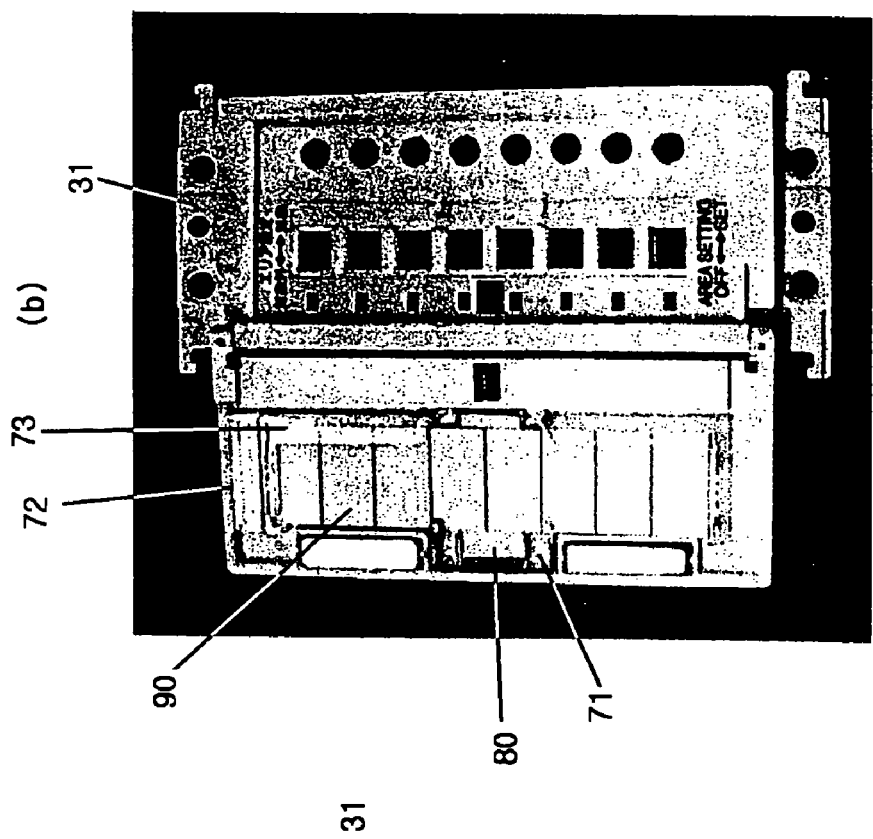
FIG. 13 shows a handle member according to a fifth embodiment of the present invention in a state of opening a door, where
Figure 13:
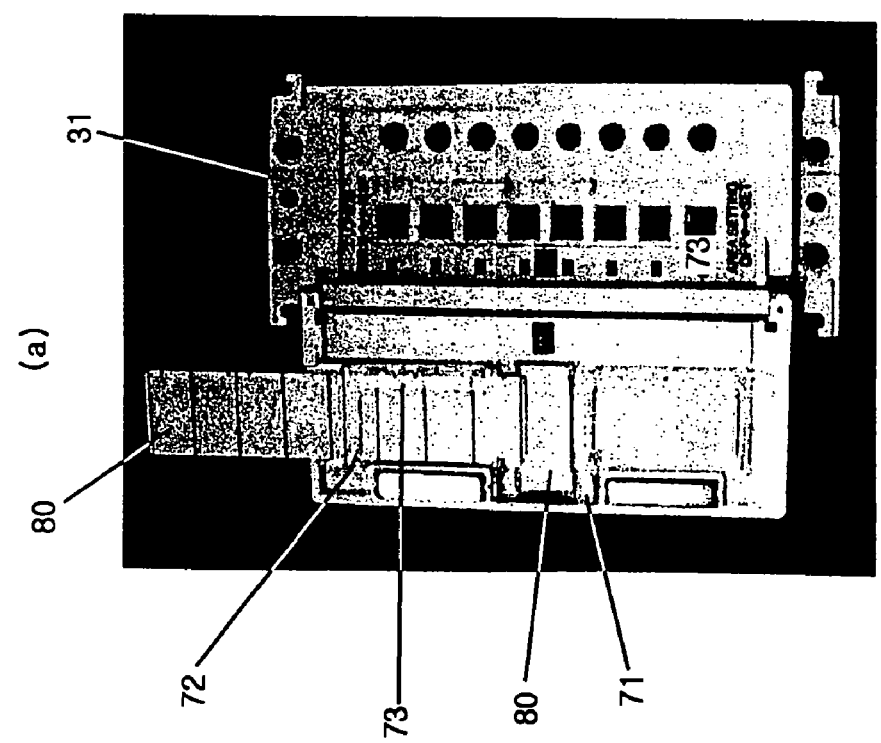
Figure 14:
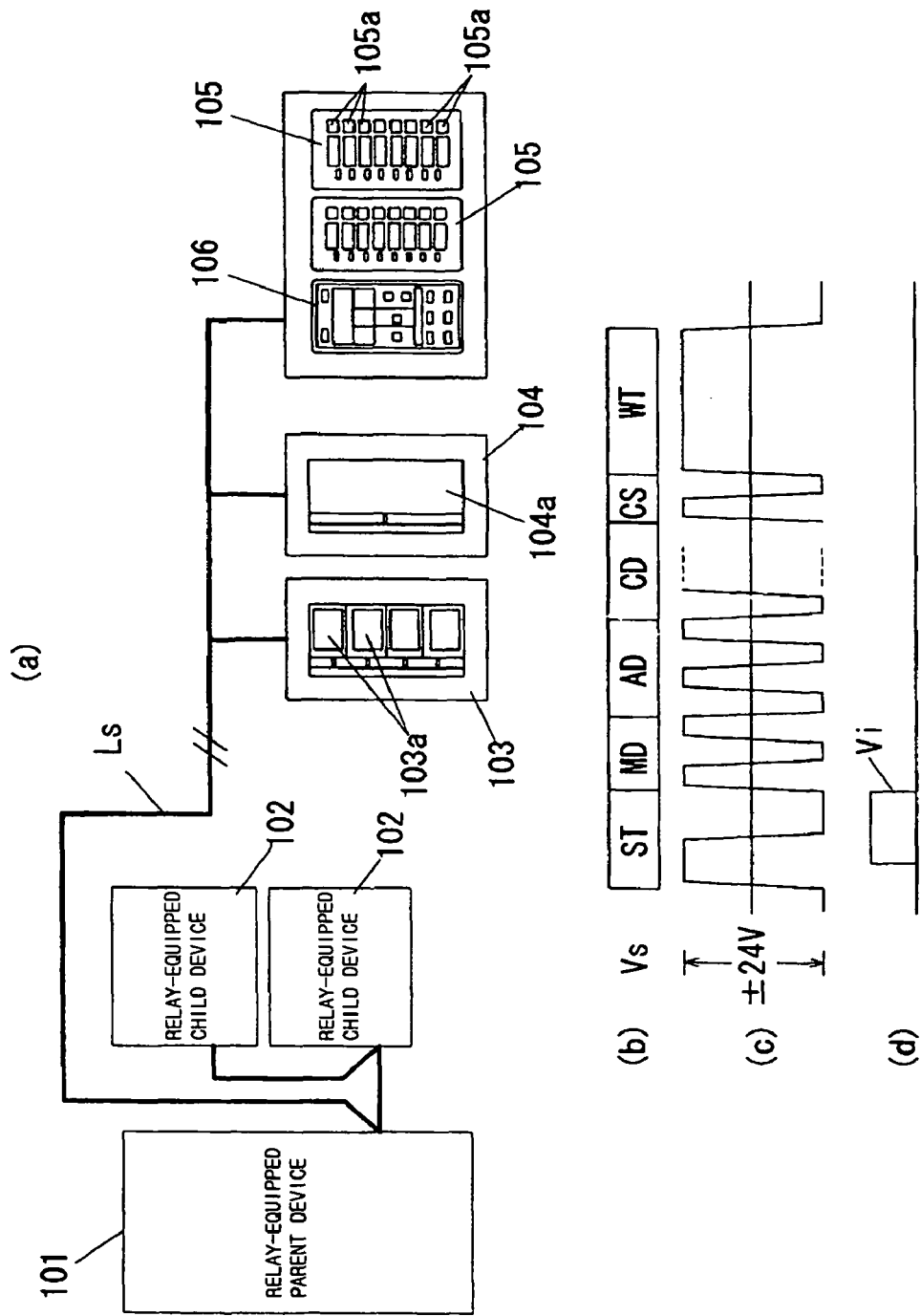
FIG. 14(a) is a schematic view showing a configuration of a conventional remote supervisory control system and FIG. 14(b) shows a transmission signal.

In the card holder 70, as shown in FIG. 13(*a*), the area name card 80 is first received and the individual name card 90 next. The individual name card 90 is inserted from the upper side of edge holders 73 to lower side thereof crossing over the area name card 80 received in the area card holding portion 71. In this way, the inserted individual name card 90 presses the area name card received in the area card holding portion 71 while being held in the individual card holding portion 72 by the edge holders 73, thereby holding the area name card 80 in the area card holding portion 71.

The specific area affected by a remote control system is marked on the area name card 80, and the marks can be seen though the eyes though the front side of the hole 36 in the sate that the door 32 covers the operating handle 31. On the other hand, the objects controlled by plural individual switches on the operation handle 31 are marked on the individual name card 90, the marks can be seen by relating them to the individual switches in the state that the door 32 is opened by the operating handle 31. Other components or any different parts of the components unexplained in the above are the same as described in the first embodiment.

According to the fifth embodiment, unlike the first embodiment, when areas controlled by remote control system or controlled objects in the same area are changed, it is only required to change a related card, especially by taking it from the card holder or placing it to the card holder after opening the door, therefore changing the card is easy.

What is claimed is:

1. An operating switch wiring device used for a remote supervisory control system, in which the operating switch wiring device for monitoring switch operations of operating switches assigned with individual addresses and a remote control wiring device for controlling opening/closing of relays assigned with the individual addresses are connected to a signal line, the operating switch wiring device outputs a transmission signal including address information and operating information according to the operations of the operating switches to the signal line, and the remote control wiring device turns on/off a relay corresponding to the address information when the address information included in the transmission signal received through the signal line is identical to the address of the corresponding relay, wherein the operating switches include a plurality of individual switches which are assigned with addresses corresponding to the addresses of the relays and individually turn on/off the corresponding relays, a group switch which groups one individual switch or plural individual switches into a group and collectively turns on/off the relays corresponding to the individual switches in the group, and a group setting means for setting whether the respective individual switches are registered in the group;

the group setting means comprising a plurality of mechanical press operators, and the group setting means can be set according to whether the individual switches are registered in the group by changing the positions of the mechanical press operators.

2. The operating switch wiring device according to claim 1, in which press portions of the plurality of individual switches and a press portion of the group switch may be disposed on the front surface of a device body provided on a constructive surface, said operating switch wiring device including;

an operating handle which is rotatably attached on the device body and has a window hole for exposing the press portions at locations facing the press portions of the individual switches and press protrusions for pressing the press portion of the group switch according to a rotation operation at a rear surface thereof; and a door which is rotatably attached on the front surface of the operating handle between a position for exposing the press portions of the individual switches and a position for covering the press portions of the individual switches, wherein the group setting means is disposed at the rear surface of the door.

3. The operating switch wiring device according to claim 1, wherein press portions of the individual switches are disposed on the front surface of a device body provided on a construction surface, said operating switch wiring device including;

an operating handle which is rotatably attached on the device body and has a window hole for exposing the press portions at portions corresponding to the press portions of the individual switches;

a door which is rotatably attached on the front surface of the operating handle between a position for exposing the press portions of the individual switches and a position for covering the press portions of the individual switches; and wherein the plurality of mechanical press operators can be provided at the rear surface of the door and are movable between a position in which the individual switches face the press portions of the individual switches and press the corresponding press portions according to the rotation of the operating handle and a position in which the individual switches are separated from the press portions, wherein the plurality of mechanical press operators configure the group setting means, and the plurality of individual switches function as the group switch.

4. A handle member used for an operating switch wiring device of a remote supervisory control system, in which the operating switch wiring device for monitoring switch operations of a plurality of operating switches assigned with individual addresses and a remote control wiring device for controlling opening/closing of relays assigned with the individual addresses are connected to a signal line, the operating switch wiring device outputs a transmission signal including address information and operation information according to the operations of the operating switches to the signal line, and the remote control wiring device turns on/off a relay corresponding to the address information when the address information included in the transmission signal received through the signal line is identical to the address of the relay, comprising:

a operating handle having attaching means for being rotatably attached on a front surface of a device body of the operating switch wiring device, wherein the operating handle includes a group setting means for setting whether the individual switches included in the operating switch wiring device are registered in a group for collectively turning on/off relays corresponding to the individual switches and press operators for pressing the individual switches in the group according to the rotation of the operating handle by the group setting means.

5. The handle member according to claim 4, wherein the operating handle has a window hold for exposing the press portions at locations facing the press portions of the individual switches disposed on the front surface of the device body, said handle member including:
   a door which is rotatably attached on the front surface of the operating handle between a position for exposing the press portions of the individual switches and a position for covering the press portions of the individual switches; and
   press operators which are provided at the rear surface of the door and are movable between a position in which the individual switches face the press portions of the individual switches and press the press portions according to the rotation of the operating handle and a position in which the individual switches are separated from the press portions,
   wherein the press operators provided at the respective individual switches configure the group setting means.

6. An operating switch wiring device used for a remote supervisory control system, in which the operating switch wiring device for monitoring switch operations of operating switches assigned with individual addresses and a remote control wiring device for controlling opening/closing of relays assigned with the individual addresses are connected to a signal line, the operating switch wiring device outputs a transmission signal including address information and operating information according to the operations of the operating switches to the signal line, and the remote control wiring device turns on/off a relay corresponding to the address information when the address information included in the transmission signal received through the signal line is identical to the address of the corresponding relay,
   wherein the operating switches include a plurality of individual switches which are assigned with addresses corresponding to the addresses of the relays and individually turn on/off the corresponding relays, a group switch which groups one individual switch or plural individual switches into a group and collectively turns on/off the relays corresponding to the individual switches in the group, and a group setting means for setting whether the respective individual switches are registered in the group;
   wherein press portions of the plurality of individual switches and a press portion of the group switch may be disposed on the front surface of a device body provided on a constructive surface, said operating switch wiring device including;
   an operating handle which is rotatably attached on the device body and has a window hole for exposing the press portions at locations facing the press portions of the individual switches and press protrusions for pressing the press portion of the group switch according to a rotation operation at a rear surface thereof; and
   a door which is rotatably attached on the front surface of the operating handle between a position for exposing the press portions of the individual switches and a position for covering the press portions of the individual switches,
   wherein the group setting means is disposed at the rear surface of the door.

7. An operating switch wiring device used for a remote supervisory control system, in which the operating switch wiring device for monitoring switch operations of operating switches assigned with individual addresses and a remote control wiring device for controlling opening/closing of relays assigned with the individual addresses are connected to a signal line, the operating switch wiring device outputs a transmission signal including address information and operating information according to the operations of the operating switches to the signal line, and the remote control wiring device turns on/off a relay corresponding to the address information when the address information included in the transmission signal received through the signal line is identical to the address of the corresponding relay,
   wherein the operating switches include a plurality of individual switches which are assigned with addresses corresponding to the addresses of the relays and individually turn on/off the corresponding relays, a group switch which groups one individual switch or plural individual switches into a group and collectively turns on/off the relays corresponding to the individual switches in the group, and a group setting means for setting whether the respective individual switches are registered in the group,
   wherein press portions of the individual switches are disposed on the front surface of a device body provided on a construction surface, said operating switch wiring device including;
   an operating handle which is rotatably attached on the device body and has a window hole for exposing the press portions at locations corresponding to the press portions of the individual switches;
   a door which is rotatably attached on the front surface of the operating handle between a position for exposing the press portions of the individual switches and a position for covering the press portions of the individual switches; and
   a plurality of press operators which can be provided at the rear surface of the door and are movable between a position in which the individual switches face the press portions of the individual switches and press the corresponding press portions according to the rotation of the operating handle and a position in which the individual switches are separated from the press portions,
   wherein the plurality of press operators configure the group setting means, and the plurality of individual switches function as the group switch.

* * * * *